United States Patent
Bathula et al.

(10) Patent No.: US 12,238,210 B2
(45) Date of Patent: Feb. 25, 2025

(54) KEYSTORE SERVICE FOR ENCRYPTION IN A SECURE SERVICE ENCLAVE

(71) Applicant: Oracle International Corporation, Redwood Shores, CA (US)

(72) Inventors: Kranthi Kumar Bathula, Sammamish, WA (US); Nachiketh Rao Potlapally, McLean, VA (US); Rakesh Basanta Parida, Sammamish, WA (US); Ricky Alan Mangus, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 302 days.

(21) Appl. No.: 17/686,757

(22) Filed: Mar. 4, 2022

(65) Prior Publication Data

US 2023/0283465 A1  Sep. 7, 2023

(51) Int. Cl.
*H04L 9/00* (2022.01)
*H04L 9/08* (2006.01)
*H04L 9/40* (2022.01)

(52) U.S. Cl.
CPC .......... *H04L 9/0894* (2013.01); *H04L 9/0822* (2013.01); *H04L 63/126* (2013.01)

(58) Field of Classification Search
CPC ... H04L 9/0894; H04L 9/0822; H04L 63/126; H04L 9/083; H04L 63/062
See application file for complete search history.

(56) References Cited

U.S. PATENT DOCUMENTS

| | | | |
|---|---|---|---|
| 2020/0053065 A1* | 2/2020 | Wisniewski | H04L 63/06 |
| 2020/0394648 A1* | 12/2020 | Blackshear | H04L 63/12 |
| 2021/0051002 A1* | 2/2021 | Cheng | H04L 9/088 |
| 2022/0200791 A1* | 6/2022 | Le Roux | H04L 9/0825 |
| 2023/0291558 A1* | 9/2023 | Lin | G06F 21/62 |

FOREIGN PATENT DOCUMENTS

| | | |
|---|---|---|
| CN | 102646077 B | 6/2016 |
| CN | 109255231 A | 1/2019 |
| CN | 109977039 B | 2/2021 |

OTHER PUBLICATIONS

Configuring External Key Management, Available Online at: https://docs.netapp.com/ontap-9/index.jsp?topic=%2Fcom.netapp.doc.pow-nve%2FGUID-DD718B42-038D-4009-84FF-20BBD6530BC2.html, Accessed from Internet on Sep. 2, 2021, pp. 1-2.

(Continued)

*Primary Examiner* — Kevin Ayala
(74) *Attorney, Agent, or Firm* — Invoke

(57) ABSTRACT

The present embodiments relate to a keystore service for encryption for a computing device of a cloud computing system. The computing device of the cloud computing system can receive a key identification, an encrypted key encryption key, an identity of a client device, and a request from the client device to store the key identification and the encrypted key identification key. The computing device can verify, based at least in part on the identity, an authority of the client device to store the key identification and encrypted key encryption key.
The computing device can transmit, based at least in part on the verification, the key identification, the encrypted key encryption key, and request to store the key identification and the encrypted key encryption key to a keystore.

20 Claims, 16 Drawing Sheets

(56) References Cited

OTHER PUBLICATIONS

Disk Encryption and Key Management with Vault Enterprise, Available Online at: https://www.datocms-assets.com/2885/1595526264-disk-encryption-and-key-management-with-vault-brief.pdf, Aug. 12, 2020, 2 pages.
Encryption at Rest, Security Guide—Chapter 14, Available Online at: https://docs.marklogic.com/guide/security/encryption, Accessed from Internet on Sep. 2, 2021, pp. 1-28.
How Amazon EMR Uses AWS KMS, Available Online at: https://docs.aws.amazon.com/kms/latest/developerguide/services-emr.html, Accessed from Internet on Sep. 2, 2021, pp. 1-5.
Moving Encryption Keys to External Storage, Available Online at: https://www.jetico.com/file-downloads/web_help/bcve4/html/04_usage/01_volume_encryption/05_moving_keys.htm, Accessed from Internet on Aug. 31, 2021, pp. 1-3.
Storage Management, IBM, Available Online at: https://www.ibm.com/docs/de/spp/10.1.7?topic=reference-storage-management, Accessed from Internet on Aug. 31, 2021, pp. 1-6.
Arora, HashiCorp Vault as an External Key Manager for NetApp Encryption, Available Online at: https://medium.com/hashicorp-engineering/hashicorp-vault-as-an-external-key-manager-for-netapp-encryption-7794297f6df1, Mar. 5, 2020, pp. 1-7.
Lanfear, Azure Disk Encryption for Windows and Linux IaaS VMs, Available Online at: https://github.com/uglide/azure-content/blob/master/articles/azure-security-disk-encryption.md, Accessed from Internet on Aug. 31, 2021, pp. 1-31.
Shinder et al., Secure Client Deployment with Trusted Boot and BitLocker, Available Online at: https://www.sciencedirect.com/science/article/pii/B9781597499804000091, 2013, pp. 239-265.

\* cited by examiner

KEYSTORE SERVICE FOR ENCRYPTION IN A SECURE SERVICE ENCLAVE

BACKGROUND

Encryption is a process of manipulating data to prevent unauthorized access to the data. Data encryption helps protect the integrity of the data stored on a computing system and during the transmission of the data. A computing device can execute data encryption software to encrypt the data such that the data is indecipherable to an unauthorized actor. An authorized actor can view the data by decrypting the data through an appropriate algorithm.

BRIEF SUMMARY

The present embodiments relate to a keystore service for encryption in a service enclave. A first exemplary embodiment provides a method for executing a keystore service for a cloud computing node. The method can include a computing device of a cloud computing system receiving a key identification, an encrypted key encryption key, an identity of a client device, and a request from the client device to store the key identification and the encrypted key identification key.

The method can further include verifying, based at least in part on the identity, an authority of the client device to store the key identification and encrypted key encryption key.

The method can further include transmitting, based at least in part on the verification, the key identification, the encrypted key encryption key, and the request to store the key identification and the encrypted key encryption key to a keystore.

The method can further include polling the keystore for a logical sequence number associated with the key identification and the encrypted key encryption key.

The method can further include reading, in response to detecting the logical sequence number, the key identification and the encrypted key encryption key from the keystore.

The method can further include storing the logical sequence number, the key identification, and the encrypted key encryption key in a storage of the computing device.

The method can further include transmitting the stored logical sequence number to the keystore.

A second exemplary embodiment relates to a cloud infrastructure node. The cloud infrastructure can include a processor and a non-transitory computer-readable medium. The non-transitory computer-readable medium can include instructions that, when executed by the processor, cause the processor to receive a key identification, an encrypted key encryption key, an identity of a client device, and a request from the client device to store the key identification and the encrypted key identification key.

The instructions can further cause the processor to verify, based at least in part on the identity, an authority of the client device to store the key identification and encrypted key encryption key.

The instructions can further cause the processor to transmit, based at least in part on the verification, the key identification, the encrypted key encryption key, and the request to store the key identification and the encrypted key encryption key to a keystore.

The instructions can further cause the processor to poll the keystore for a logical sequence number associated with the key identification and the encrypted key encryption key.

The instructions can further cause the processor to read, in response to detecting the logical sequence number, the key identification and the encrypted key encryption key from the keystore.

The instructions can further cause the processor to store the logical sequence number, the key identification, and the encrypted key encryption key in a storage of the computing device.

The instructions can further cause the processor to transmit the stored logical sequence number to the keystore.

A third exemplary embodiment relates to a non-transitory computer-readable medium. The non-transitory computer-readable medium can include stored thereon a sequence of instructions, which, when executed by a processor cause the processor to execute a process. The process can include receiving a key identification, an encrypted key encryption key, an identity of a client device, and a request from the client device to store the key identification and the encrypted key identification key.

The process can also include verifying, based at least in part on the identity, an authority of the client device to store the key identification and encrypted key encryption key.

The process can also include transmitting, based at least in part on the verification, the key identification, the encrypted key encryption key, and the request to store the key identification and the encrypted key encryption key to a keystore.

The process can also include polling the keystore for a logical sequence number associated with the key identification and the encrypted key encryption key.

The process can also include reading, in response to detecting the logical sequence number, the key identification and the encrypted key encryption key from the keystore.

The process can also include storing the logical sequence number, the key identification, and the encrypted key encryption key in a storage of the computing device.

The process can also include transmitting the stored logical sequence number to the keystore.

DETAILED DESCRIPTION

Figure 1:
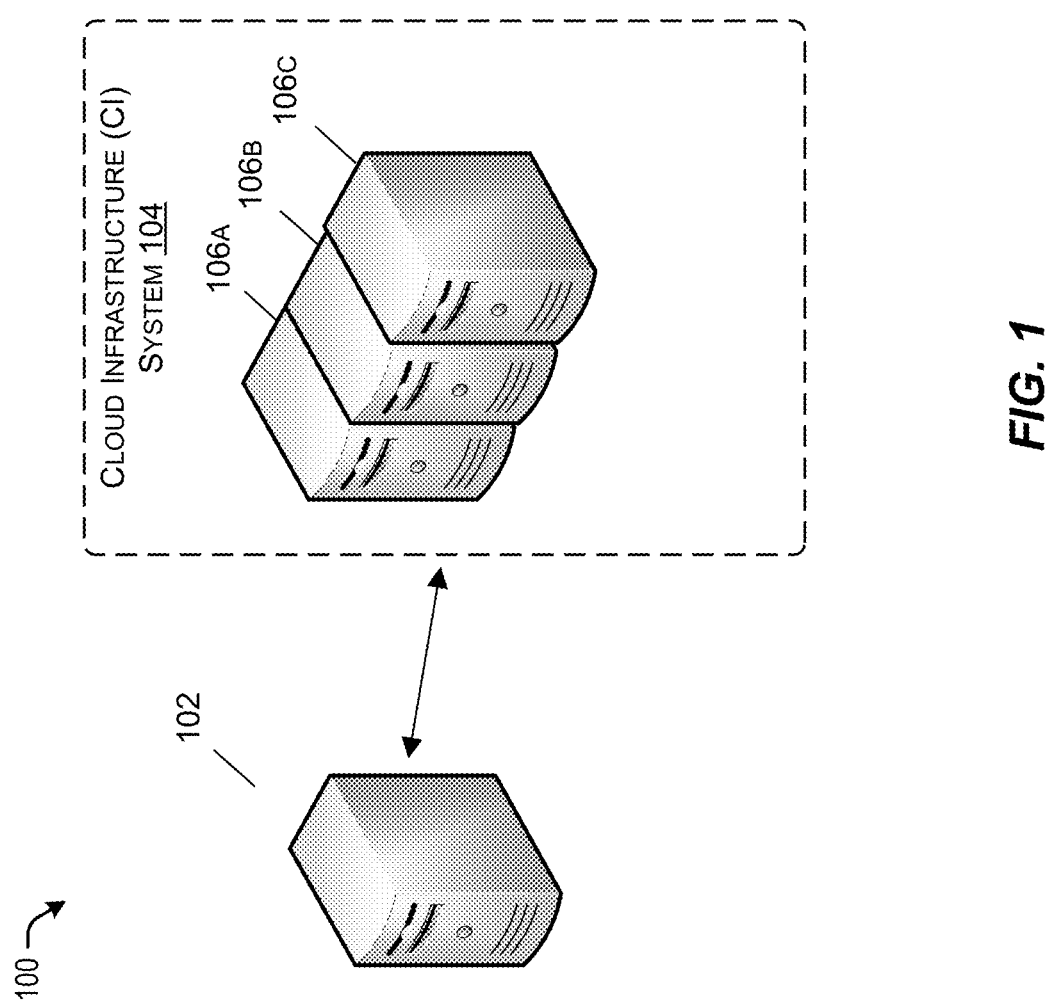
FIG. 1 is a block diagram of a network environment according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Cloud computing data centers house the physical servers and data storage for the entity offering the cloud computing services. A single data center can house a single server or maintain hundreds of servers on racks. Each server stores local hard discs that store encrypted files for both the cloud computing provider and cloud computing clients. In some instances, the encryption keys used to encrypt or decrypt the disc files are stored on the same server storing the hard disc. Therefore, if a malicious actor were to remove a server from a data center, the malicious actor could retrieve the encryption keys from the server and decrypt files stored on the discs in the server. As the encryption keys are stored locally on the server, the malicious actor could access the encryption keys and files without reestablishing a connection with the data center's network.

Embodiments of the present disclosure provide techniques for a computing device-specific keystore service that secures the computing device's local files, even if the computing device is subsequently removed from the data center's network. A computing device can use a key encryption key (KEK) to encrypt a file stored locally on a hard disc. The computing device can further generate an encryption key to encrypt the KEK. The computing device can further generate a key identification to identify the encrypted KEK. The computing device can transmit the encrypted KEK and the key identification to a keystore service. The encryption key and the key identification remain stored locally on the computing device and are only known to the computing device. In the instance that the computing device needs to view the encrypted file, it sends the key identification and a request for the encrypted KEK to the keystore service. Once the encrypted KEK is returned, the computing device uses the encryption key to decrypt the encrypted KEK. The computing device then uses the KEK to decrypt the file.

As an exemplary illustration, a computing device of a cloud computing data center (e.g., a server) stores a bootloader on a local disc. The computing device can encrypt the bootloader file using a KEK. The computing device can then encrypt the KEK using an encryption key. The computing device can further generate a key identification to identify the encrypted KEK. The computing device can then transmit the encrypted KEK to a network keystore service, while locally storing the encryption key and the key identification. At some point in the future, the computing device may be configured to (e.g., may be required to) create a new instance. The computing device can transmit a request to fetch the encrypted KEK from the network keystore service. The network keystore service can return the encrypted KEK to the computing device. The computing device can use the encryption key to decrypt the encrypted KEK and then use the KEK to decrypt the bootloader file. The computing device can then execute the bootloader file to initiate the new instance.

Referring to FIG. 1, a block diagram of an exemplary network environment 100 according to one or more embodiments is shown. The network environment 100 can be operable to permit data communication between devices within the network environment 100 using one or more wired or wireless networks. As illustrated in FIG. 1, the network environment 100 includes a computing device 102 and a cloud infrastructure system 104 (including corresponding computing devices 106a-c).

The computing device 102 can include a computing device (e.g., a server or series of computing devices) of the cloud infrastructure system 104. For example, the computing device 102 can include a server that can be connected to the cloud infrastructure system 104 at a data center environment (e.g., a colocation center). The computing device 102 can be configured to perform various processing tasks to implement one or more application services. The cloud infrastructure system 104 can include one or more interconnected computing devices implementing one or more cloud computing applications or services. For example, the cloud infrastructure system 104 can store and provide access to database data (e.g., via a query of the database). The computing devices 106a-c included in the cloud infrastructure system 104 can be in one or more data center environments (e.g., colocation centers). In many instances, the computing device 102 can be located at the same data center environment and a part of the same cloud infrastructure system as at least one of the computing devices 106a-c.

The computing device 102 can be configured to generate a KEK to encrypt a file stored locally on a disc of the computing device 102. The KEK can be an encryption key that can be generated based on a user-generated passphrase used to secure the file. The computing device 102 can further generate an encryption key to encrypt the KEK. The encryption key can be, for example, a symmetric encryption key generated in accordance with the Advanced Encryption Standard (AES). The computing device 102 can further generate key identification to identify the encrypted KEK (e.g., an AES(KEK)). The computing device 102 can further transmit the encrypted KEK and the key identification to a keystore service operating on the cloud infrastructure system 104. The computing device 102 can further locally store the encryption key and the key identification. For example, the computing device 102 can store the encryption key and the key identification on the disc. Therefore, even if another computing device discerns the key identification and requests the encrypted KEK, only the computing device 102 has the encryption key to decrypt the encrypted KEK.

A host executing a keystore service on a corresponding computing device (e.g., one of the corresponding computing devices 106a-c) can receive the encrypted KEK from the computing device. The host can further transmit the encrypted KEK and the key identification to a backend keystore of a keystore service. The host can further replicate the encrypted KEK and the key identification in its local storage. Furthermore, any other host that is executing the keystore service further stores a replicated instance of the encrypted KEK and the key identification at their respective local storage. In this sense, the computing device 102 can retrieve the encrypted KEK from any host executing the keystore service.

The computing device 102 can transmit a request to fetch the encrypted KEK back. Any host executing the keystore service can receive a request from the computing device 102 for the encrypted KEK. In response to the request, the host can identify the requested encrypted KEK by the key identification, and retrieve the encrypted KEK from its respective local storage and return it to the computing device 102. It should be appreciated that the host that originally transmits the encrypted KEK and key identification to the backend keystore is not necessarily the host that receives the request to fetch the encrypted KEK from the backend keystore.

Figure 2:
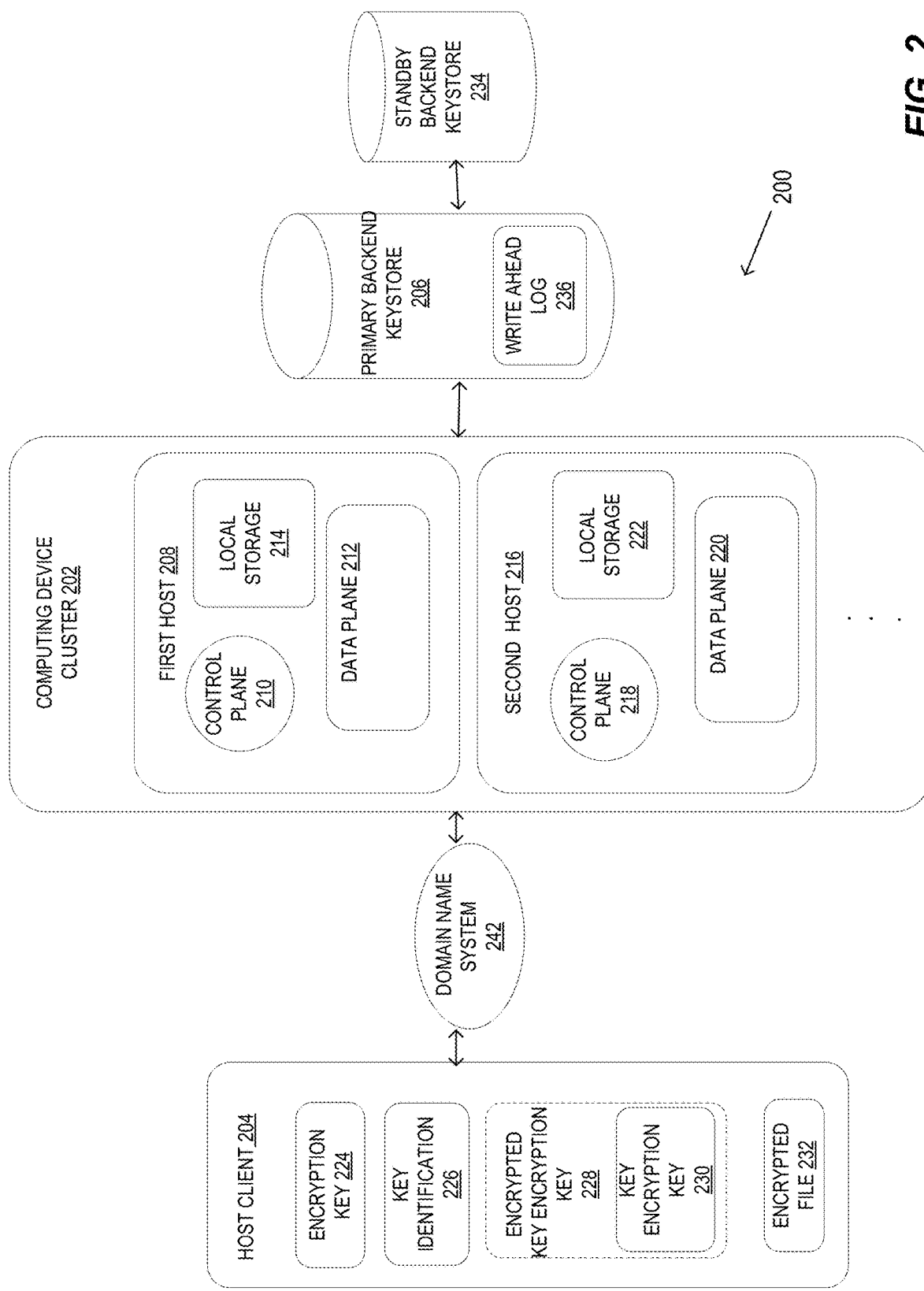
FIG. 2 is a block diagram of an exemplary cloud computing infrastructure system in operable communication with a host device, according to at least one embodiment.

Referring to FIG. 2, a computing device cluster 202 of a cloud infrastructure system is shown according to one or more embodiments. The computing device cluster 202 can include a set of computing devices (e.g., corresponding computing device 106a-c) that can each serve a single purpose. The purpose can be, for example, executing a keystore service that manages keys and certificates, message security, encryption, and related tasks. The computing devices can further be physically interconnected and located at a data center (e.g., a colocation center).

Computing Device Cluster

The computing device cluster 202 can include a first host 208 and a second host 216. Each of the first host 208, and the second host 216, can execute an instance of the keystore service. It should be appreciated that although only a first host 208 and a second host 216 are illustrated, the computing device cluster 202 can include a greater number of hosts. It should further be appreciated that each of the first host 208, and the second host 216, have the same functionality. For purposes of brevity herein, the below-described functionality of the first host 208 should be understood to describe the functionality of the second host 216.

The first host 208 can perform multiple processes for the keystore service. The first host 208 can receive a key identification 226 and an associated encrypted KEK 228 from a host client 204. The host client 204 can execute on a computing device (e.g., computing device 102). The key identification 226 and the encrypted KEK 228 can be received by a control plane 210 of the first host 208. In response to receiving the key identification 226 and the encrypted KEK 228, the control plane 210 can compare the key identification 226 to a list of key identifications stored in primary backend keystore 206 to determine if the key identification is unique. The primary backend keystore 206 can be a database system (e.g., an Oracle database). The primary backend keystore 206 can include a list of previously generated key identifications and associated encrypted KEKs. If the key identification 226 matches a previously stored key identification, an error message can be generated. If the key identification 226 does not match a previously stored key identification, the control plane 210 can send instructions to write the key identification 226 and encrypted KEK 228 to a primary backend keystore 206. The primary backend keystore 206 can be a repository of key identifications, private keys, certificates, and symmetric keys. In some embodiments, the primary backend keystore 206 can store the key identification and encrypted KEK as a tuple (e.g., (KEYID, KEK)). In some embodiments, the contents of the primary backend keystore 206 can be written to a standby backend keystore 234 in case the primary backend keystore 206 fails.

The control plane 210 can transmit instructions to the primary backend keystore 206 to store the key identification 226 and encrypted KEK 228. The control plane's write instructions, key identification 226, and encrypted KEK 228 can be intercepted and copied at a write ahead log 236 of the primary backend keystore 206. The write ahead log can include a table of previously stored key identifications and encrypted keys. Each time the write ahead log 236 creates a new entry for a key identification and encrypted KEK, a unique identifier, known as a logical sequence number, can be created for the entry. The logical sequence number can increase with each new entry into the write ahead log 236 such that the newer logical sequence numbers are larger than the older logical sequence numbers.

As part of the keystore service, the data plane 212 can continuously poll the write ahead log 236 for a new logical sequence number. In the instance that the data plane 212 detects a new logical sequence number, the data plane 212 can read the write ahead log and retrieve the newest logical sequence number, associated key identification, and associated encrypted KEK from the write ahead log 236. The data plane 212 can then store the new logical sequence number, key identification, and encrypted KEK in local storage 214. The data plane 212 can then publish the new logical sequence number back to the primary backend keystore 206.

It should be appreciated that the data plane 220 of the second host 216 can also continuously poll the write ahead log 236 for the newest logical sequence number. In the instance that the data plane 220 detects the new logical sequence number, the data plane 220 can read the write ahead log and can retrieve the newest logical sequence number, associated key identification, and associated encrypted KEK from the write ahead log 236. The data plane 220 can then store the new logical sequence number, key identification, and encrypted KEK in local storage 222. The data plane 220 can then publish the new logical sequence number back to the primary backend keystore 206.

A background application (not shown) executing on a host (e.g., the first host 208 or the second host 216) of the computing device cluster 202 can monitor the logical sequence numbers published by the data planes 212 220. The background application can then compare the logical sequence numbers with each other. Based on the comparison, the background application can determine whether each local storage has been updated to reflect the new logical sequence number associated with the newly added key identification 226 and encrypted KEK 228. If a host of the computing device cluster 202 has not updated their local storage, the background process can alert the offending host.

At some point, the host client 204 may retrieve (e.g., be required to) the encrypted KEK 228 to decrypt (unlock) unlock the hard disk. The first host 208 can retrieve the encrypted KEK 228 for the host client 204. A data plane 212 of the first host 208 can receive a request to fetch the encrypted KEK 228. The request can include an identity of the sender. The data plane 212 can verify that the host client 204 is authorized to access the network. The host client 204 can include its identity along with the request to fetch the encrypted KEK 228. The data plane 212 can compare an identity of the host client 204 to a list of authorized computing devices. If the host client 204 is unauthorized, an error message can be generated. If the host client 204 is authorized, the request can be processed. In this sense, an additional layer of network security can be added to the process. Therefore, to decrypt an encrypted file, the host client 204 should know the encryption key 224 and key identification 226; and the host client 204 should be authorized to operate on the network.

The host client 204 can include the key identification 226 along with the request. The data plane 212 can compare the key identification 226 with key identifications stored in the local storage 214 to identify a match. If the data plane 212 cannot determine a match, an error message can be generated. If the data plane 212 finds a match, the data plane 212 fetches the encrypted KEK 228 associated with the key identification 226 from local storage 222. The data plane 212 then transmits the encrypted KEK 228 back to the host client 204.

Host Client

The host client 204 can be software that can execute on a computing device (e.g., computing device 102) on the same network as the computing device cluster 202. The host client 204 can encrypt a file stored on a local disc using a KEK 230 to generate an encrypted file 232. The host client 204 can then generate an encryption key 224. The host client 204 can further encrypt the KEK 230 using the encryption key 224, thereby generating the encrypted KEK 228 (e.g., an AES (KEK)). The AES(KEK) can be, for example, a 128-, 192-, or 256-bit encryption key. In effect, the encrypted KEK 228 can be a security layer wrapped around the KEK 230. To decrypt the encrypted file 232, a computing device would need the KEK 230. To obtain the KEK 230, a computing device would need to decrypt the encrypted KEK 228. To decrypt the encrypted KEK 228, a computing device would need the encryption key 224. The encryption key 224 can be, for example, a symmetric encryption key. The host client 204 can further generate a key identification 226, which can be a set of characters that act as a unique identifier of the encrypted KEK 228. Therefore, to identify the encrypted KEK 228 from a set of encrypted KEKs, a computing device would need the associated key identification 226.

The host client 204 can contact the computing device cluster 202 via a domain name system 242. The domain name system 242 can be a distributed internet system that matches a computing device with an available computing device cluster host. In some embodiments, the domain name system 242 can distribute a request from the host client 204 in a round-robin fashion. The domain name system 242 can include a mapping of each host client to the respective IP addresses of each computing device cluster host that offers the keystore service. For each request from a host client, the domain name system 242 can perform a lookup of the list of IP addresses of the computing device cluster hosts. The domain name system 242 can then sequentially transmit each request to an IP address on the list. It should be appreciated that the computing device cluster host that transmits the key identification 226 and the encrypted KEK 228 is not necessarily the computing device cluster host that retrieves the encrypted KEK 228 for the host client 204.

The first host 208 can act as a security layer for the encrypted KEK 228 from an unauthorized request. In response to receiving the request, the first host 208 can verify that the request is from a computing device authorized to access network resources. For example, the request for the encrypted KEK 228 can include an identification of the host client 204. The first host 208 can use the identity to verify that the host client 204 is authorized to use the network. The first host 208 can compare the identity of the host client 204 to the known identities of authorized network users. If the host client 204 is unauthorized, an error message can be generated. If the host client 204 is authorized, the first host 208 can process the request. Consider an example in which a hard disc is removed from the host client 204 and reinserted into an unauthorized computing device. In this scenario, the unauthorized computing device could not receive the encrypted KEK 228 as the first host 208 would not recognize the identity of the unauthorized computing device.

The host client 204 can encrypt multiple files, create multiple key identifications, and store multiple key identifications. In some embodiments, the host client 204 can create and store a predetermined limit (e.g., ten key identifications) of key identifications. In these instances, each time that the host client 204 creates a new key identification, the host client 204 determines whether the total number of key identifications, including the new key identification, exceeds the predetermined limit of key identifications. If the new key identification causes the total number of key identifications to exceed the predetermined limit of key identifications, the host client 204 deletes the oldest key identification. Additionally, in response to determining that the number of key identifications exceeds the predetermined limit of key identifications, the host client 204 can call the first host 208. The control plane 210 of the first host 208 can check the primary backend keystore 206 and verify that the key identification is stored in the primary backend keystore 206 and belongs (e.g., created by) to the host client 204. If the key identification is not stored in the primary backend keystore 206, or does not belong to the host client 204; an error message can be generated. If the key identification is stored in the primary backend keystore 206 and belongs to the host client 204, the control plane 210 can instruct the primary backend keystore 206 to delete the key identification and associated encrypted KEK. Furthermore, the host client 204 can delete the oldest key identification from its local storage 214. Furthermore, the deletion of a record in primary backend keystore 206 also can result in a new entry in write ahead log 236. This new entry can be of type 'deletion' for the write ahead log. Upon detecting this entry, for example, via a background process, each host in the cluster can process the deletion action, which results in the corresponding record (e.g., key identification and encrypted KEK) being deleted from each host's local storage.

Figure 3:
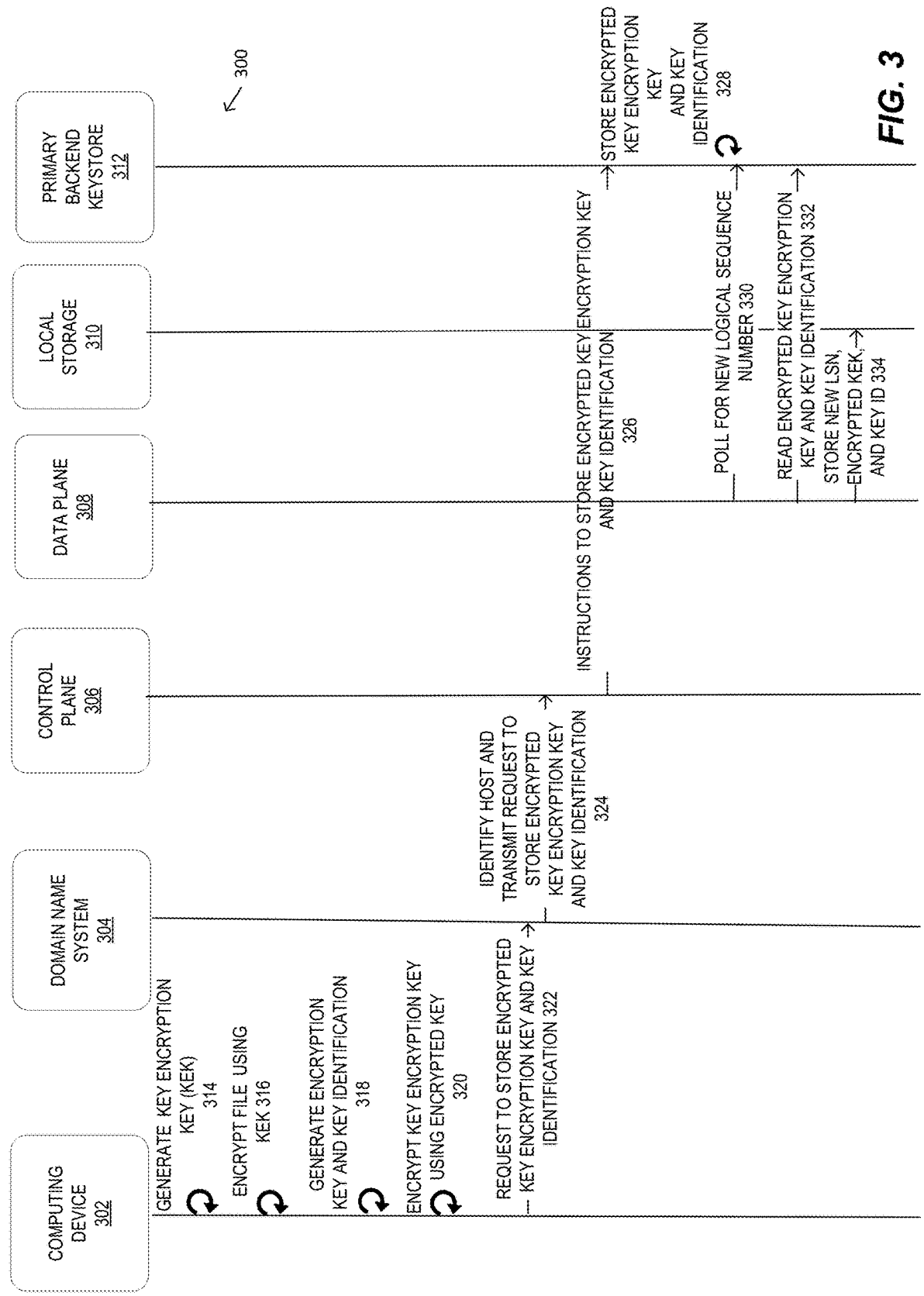
FIG. 3 is a signaling process illustrating an exemplary method for storing an encrypted key encryption key and a key identification in a primary backend keystore by a control plane of a host, according to at least one embodiment.

Referring to FIG. 3, a signaling process 300 illustrating steps for storing an encrypted KEK and a key identification according to one or more embodiments is shown. As shown in FIG. 3, a computing device 302, a domain name system 304, a control plane 306, a data plane 308, a local storage 310, and a primary backend keystore 312 can interact with each other. While the operations of processes 300, 400, 500, 700, 800, 900, 1000, and 1100 are described as being performed by generic computers, it should be understood that any suitable device (e.g., a user device, a server device) may be used to perform one or more operations of these processes. Processes 300, 400, 500, 700, 800, 900, 1000, and 1100 (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

At 314, the computing device 302 can generate a KEK. The KEK can be an encryption key that can be generated based on a user-generated passphrase. At 316, the computing device 302 can encrypt the file using the KEK. At 318, the computing device 302 can generate an encryption key and a key identification. The encryption key can be, for example, an Advanced Encryption Standard (AES) key-encryption-key (KEK). The key identification can be a unique identifier for an encrypted KEK. At 320, the computing device 302 can encrypt the KEK using the encryption key to generate an encrypted KEK (e.g., an AES(KEK)).

At 322, the computing device 302 can transmit a request to the domain name system 304 for a host to store the encrypted KEK. In some embodiments, the computing device can select an internet protocol from a set of available internet protocols. The internet protocols can be communication protocols that can be utilized by a host to communicate with the computing device 302. The computing device 302 can then transmit the request via an application programming interface (API) that implements the selected internet protocol. At 324, the domain name system 304 can transmit the request to the control plane 306 of a host. In some embodiments, the domain name system 304 can assign the request to a host from a set of hosts in a round-robin format as described above. At 326, the control plane 306 of the selected host can transmit instructions to the primary backend keystore 312 to store the encrypted KEK and the key identification. At 328, the primary backend keystore stores the encrypted KEK and the key identification. The encrypted KEK and the key identification are initially stored in a write ahead log of the primary backend keystore 312. Each time that the write ahead log creates a new entry, the write ahead log generates a logical sequence number (LSN) identifying the entry. At 330, the data plane 308 of each of the selected hosts continuously poll the write ahead log for a new logical sequence number. At 332, the data plane 308 can read the key identification and encrypted key encryption key associated with the new logical sequence number. At 334, the data plane 308 can store the new logical sequence number, the key identification, the encrypted KEK in a local storage 310 of the selected host.

Figure 4:
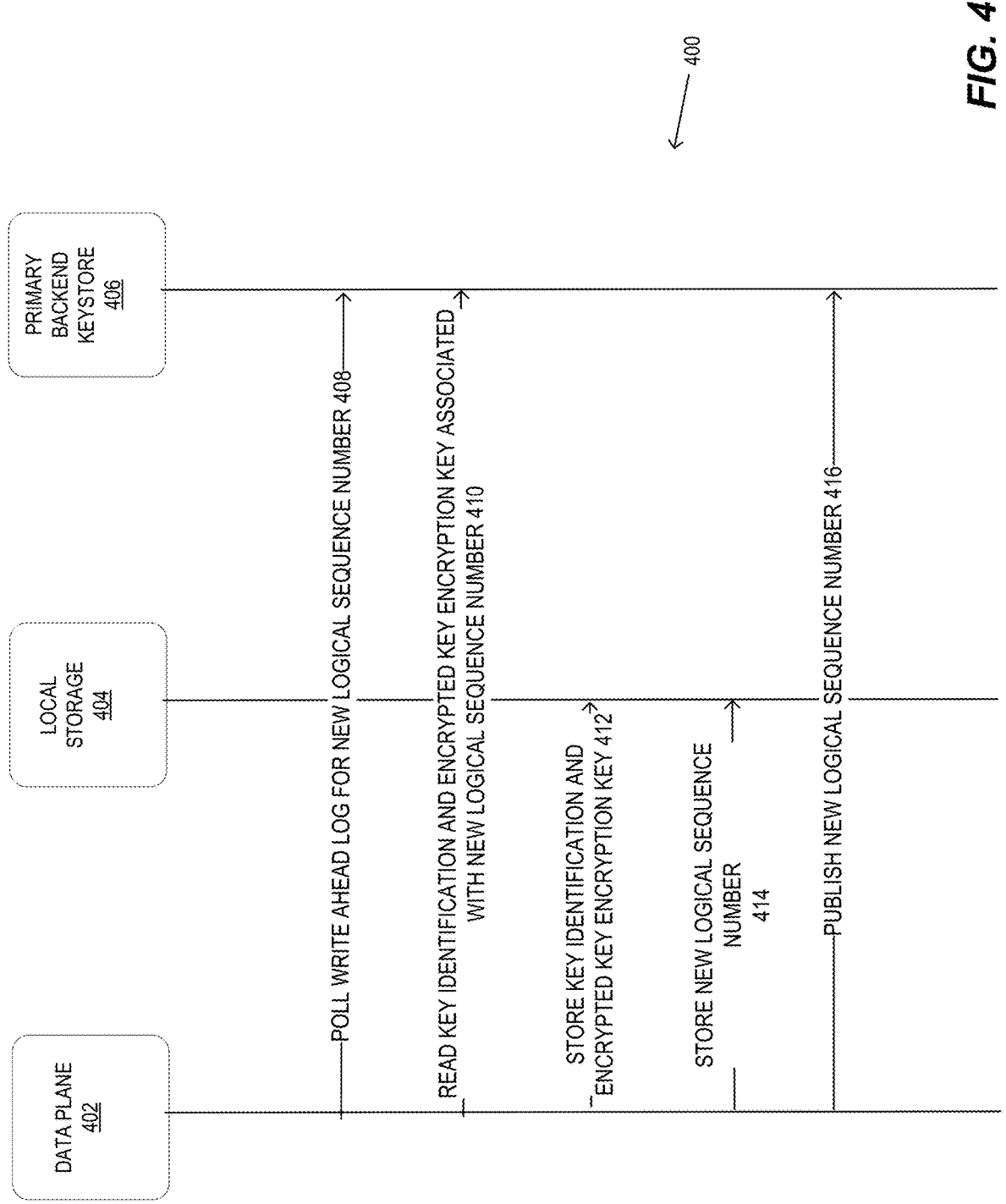
FIG. 4 is a signaling process illustrating an exemplary method for storing an encrypted key encryption key, a key identification, and a logical sequence number in a local storage by a data plane of a host, according to at least one embodiment.

Referring to FIG. 4, a signaling process 400 illustrating steps for replicating an encrypted KEK and a key identification according to one or more embodiments is shown. In this process 400, the replicating host is not the host that transmitted the instructions to store the key identification and encrypted KEK as referenced in FIG. 3. As shown in FIG. 4, a data plane 402, a local storage 404, and a primary backend keystore 406 can interact with each other. At 408, a data plane 402 of the host can poll the primary backend keystore 406 for any new logical sequence number. In response to detecting a new logical sequence number, the data plane 402 can read the key identification and the encrypted KEK associated with the new logical sequence number at 410. At 412, the data plane 402 can store the key identification and the encrypted KEK in a local storage 404 of the host. At 414, the data plane 402 can store the new logical sequence number in the local storage 404. For example, the data plane can store the new logical sequence number, the key identification, and the encrypted KEK in a table stored in the local storage 404. At 416, the data plane 402 can publish the stored new logical sequence number to the primary backend keystore 406. A background process executing on the host can verify that each host of the computing device cluster has published the same new logical sequence number. If a host has not published the new logical sequence number, the background process can alert the offending host.

Figure 5:
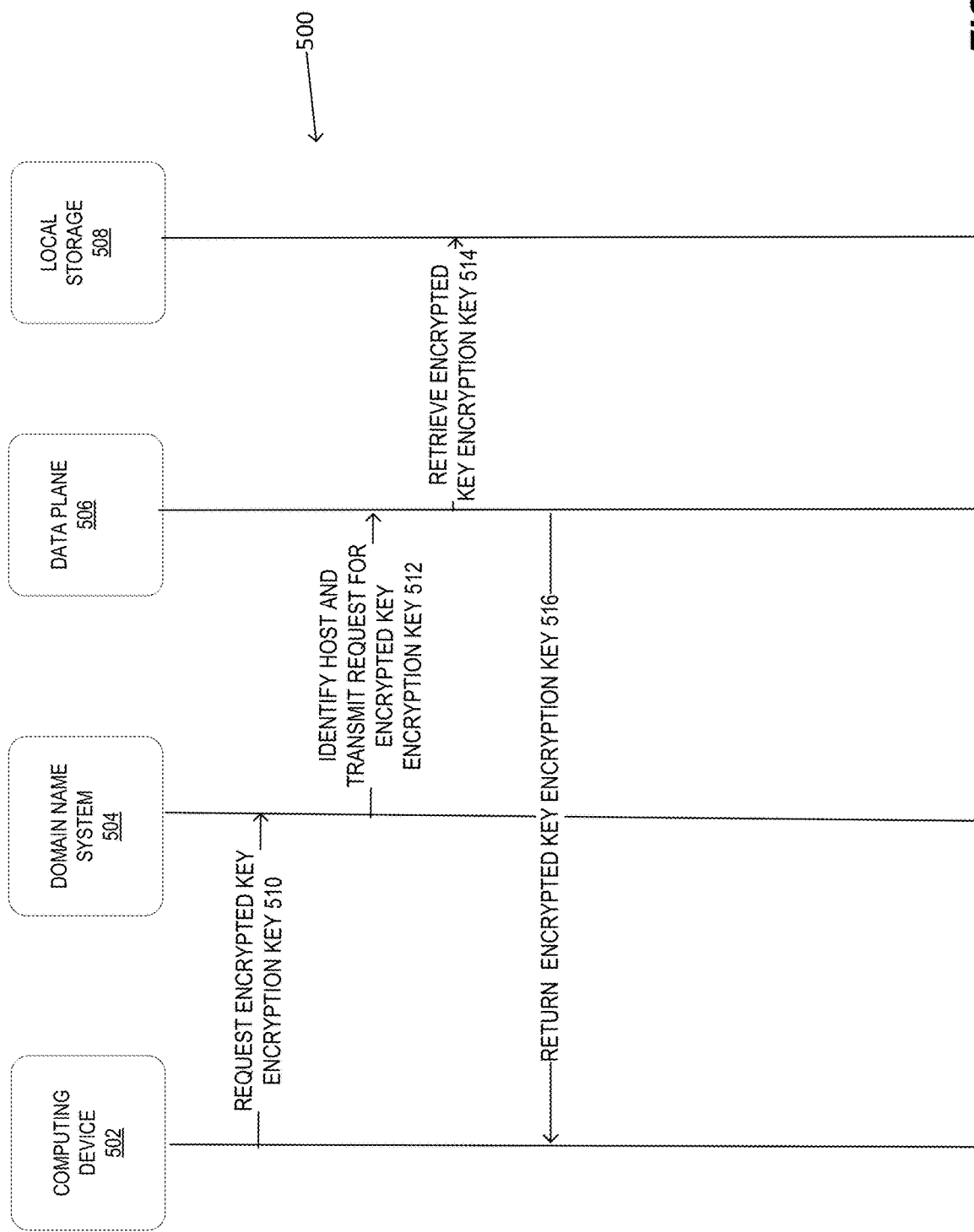
FIG. 5 is a signaling process illustrating an exemplary method for retrieving an encrypted key encryption key, according to at least one embodiment.

Referring to FIG. 5, a signaling process 500 illustrating steps for retrieving an encrypted KEK according to one or more embodiments is shown. As shown in FIG. 5, a computing device 502, a domain name system 504, a data plane 506, and a local storage 508 can interact with each other. Only the computing device that requested the encrypted KEK to be stored has the encryption key to decrypt the encrypted KEK and the encrypted file. Therefore, the computing device 502 can be the same computing device 302 described by FIG. 3 to be an authorized transaction. At 510, a computing device 502 can transmit a request to fetch an encrypted KEK to the domain name system 504. In some embodiments, the computing device 502 selects an internet protocol from a set of internet protocols that a network can be operable to communicate through. In these embodiments, the computing device 502 can transmit the request via an application programming interface (API) that implements the selected internet protocol.

At 512, the domain name system 504 can select a host from a set of available hosts in a computer device cluster and transmit the request to the data plane 506 of the selected host. In some embodiments, the domain name system 504 can execute in a round-robin format to select the host. In these embodiments, the domain name system 504 can look up a list of available hosts and sequentially matches any requests with hosts on the list. At 514, the data plane 506 can retrieve the requested encrypted KEK from the local storage 508 of the selected host. The request for the encrypted KEK includes an associated key identification. The local storage 508 includes a table identifying encrypted KEKs and associated key identification. The data plane 506 matches the key identification included in the request with a key identification identified in the local storage 508. The data plane 506 can then retrieve the encrypted KEK from the local storage 508 based on the match. At 516, the data plane 506 can return the requested encrypted KEK to the computing device 502.

Figure 6:
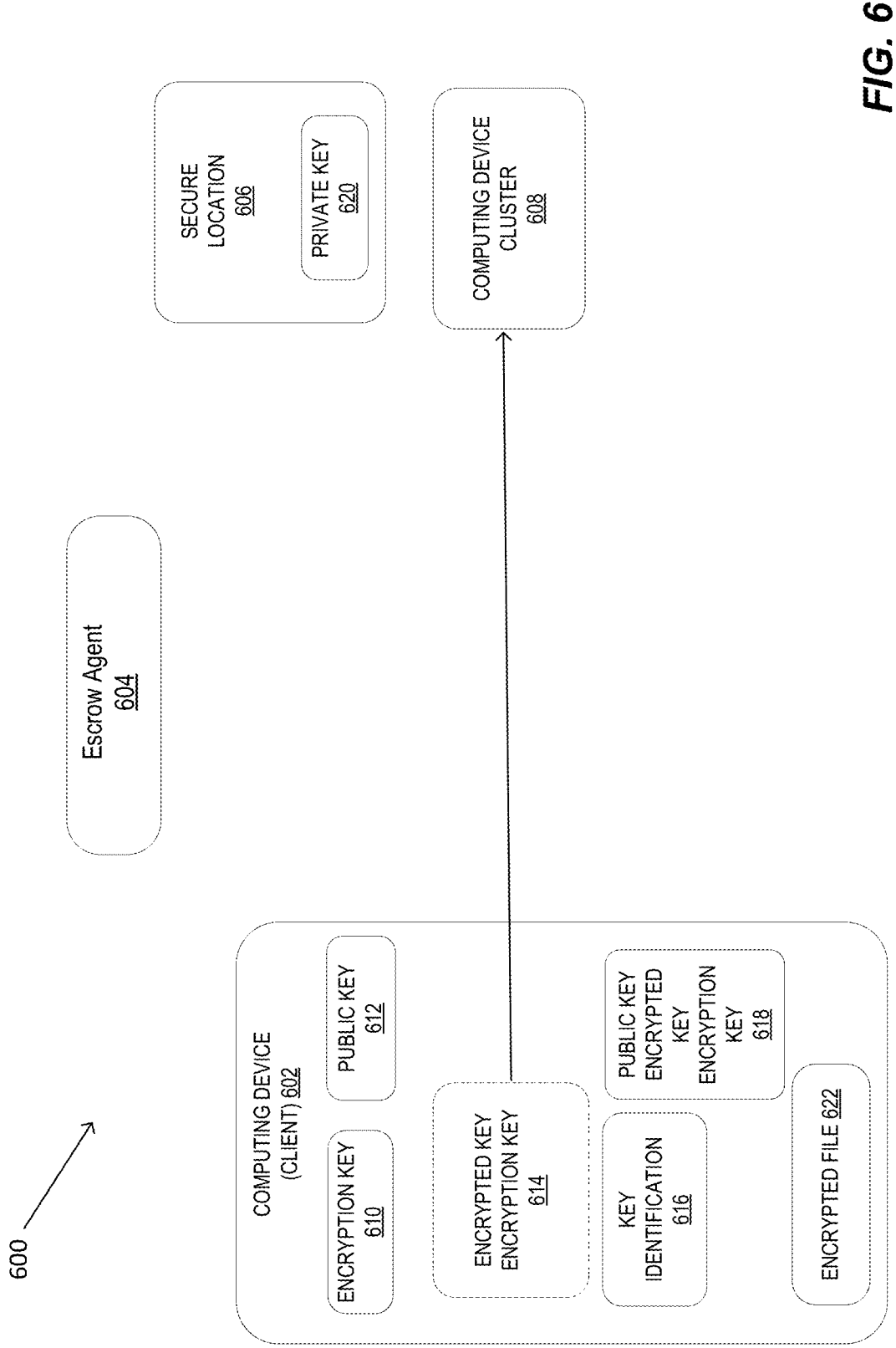
FIG. 6 is a block diagram illustrating an exemplary method for retrieving a key encryption key, according to at least one embodiment.

Referring to FIG. 6, a system 600 for recovering a lost KEK is illustrated according to an embodiment. If a KEK is lost or corrupted, the illustrated system 600 can be used to recover the KEK. As illustrated, a computing device 602 can store an encryption key 610, a key identification 616, an encrypted file 622, and generate an encrypted KEK as described above. The computing device 602 can further encrypt the KEK using an encryption key 610 to generate an encrypted KEK 614. The computing device can erase the KEK and transmit the encrypted KEK 614 to be stored by a keystore service in communication with the computing device cluster 608 as described above.

In this embodiment, the computing device can also store a public key 612. The public key 612 can be an encryption key used in asymmetric cryptography and generally includes a set of numeric values. The public key 612 can be generated by a user or by a third party, such as an escrow agent 604. The escrow agent 604 can be encryption software that can generate the public key 612 and a private key 620. Using the private key 620, the escrow agent 604 can decrypt a file previously encrypted with the public key 612.

The computing device 602 can use the public key 612 to encrypt the above-referenced KEK to generate a public key encrypted KEK 618. Unlike the encrypted KEK 614, the public key encrypted KEK 618 can be stored locally on the computing device 602. The private key 620 can be created and stored externally. Therefore, even if an unauthorized user discovers the public key 612, without the private key 620, the unauthorized user cannot decrypt the public key encrypted KEK 618. In addition to generating the public key 612, the user or the escrow agent 604 can generate the private key 620. The private key 620 can be an encryption key that can be used to decrypt a file that has been encrypted using the public key 612. The private key 620 can be stored in a secure location 606. For example, the secure location 606 can be a secure physical area of a data center with no external network connectivity.

If the KEK cannot be retrieved using the encryption key 610, the public key encrypted KEK 618 can be transported to the secure location 606 for decryption. For example, the public key encrypted KEK 618 can be stored on a disc and physically transported to the secure location 606. At the secure location 606, the escrow agent 604 can receive the public key encrypted KEK 618, and the private key 620. The escrow agent can further decrypt the public key encrypted KEK 618 using the private key 620. Once the public key encrypted KEK 618 is decrypted, the KEK can be transmitted back to the computing device 602 using the same transport mechanism as above.

Figure 7:
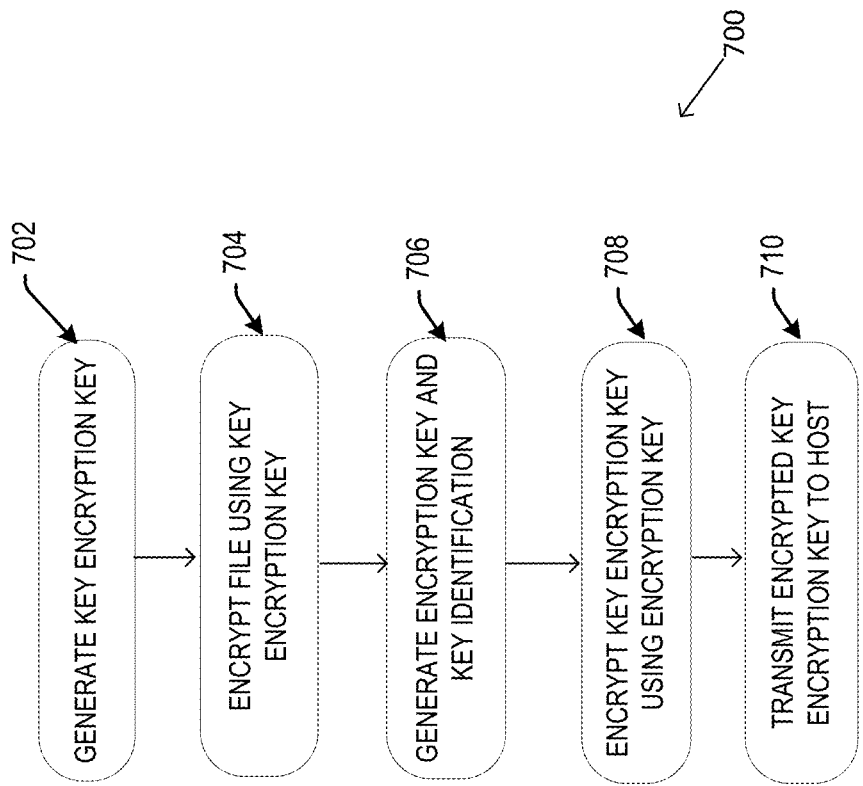
FIG. 7 is a block diagram illustrating an exemplary method for generating a key identification and an encrypted key encrypted key, according to at least one embodiment.

Referring to FIG. 7, a block diagram 700 illustrating an example process for transmitting an encrypted KEK in accordance with an embodiment is shown. At 702, a computing device can generate or receive a KEK. The KEK can be a set of characters based on a user-defined passphrase. At 704, the computing device can encrypt a file of a locally stored disc using the KEK, for example, a bootloader file. At 706, the computing device can generate an encryption key and a key identification. The encryption key can be, for example, an Advanced Encryption Standard (AES) key-encryption-key (KEK). The AES(KEK) can be, for example, a 128-, 192-, or 256-bit encryption key. At 708, the computing device can encrypt the KEK using the encryption key, thereby creating an encrypted KEK. The key identification can be associated with the encrypted KEK. It should be appreciated that upon encrypting the KEK, the computing device can erase the KEK. At 710, the computing device can transmit the encrypted KEK to a host device of a computing device cluster along with instructions to store the encrypted KEK.

Figure 8:
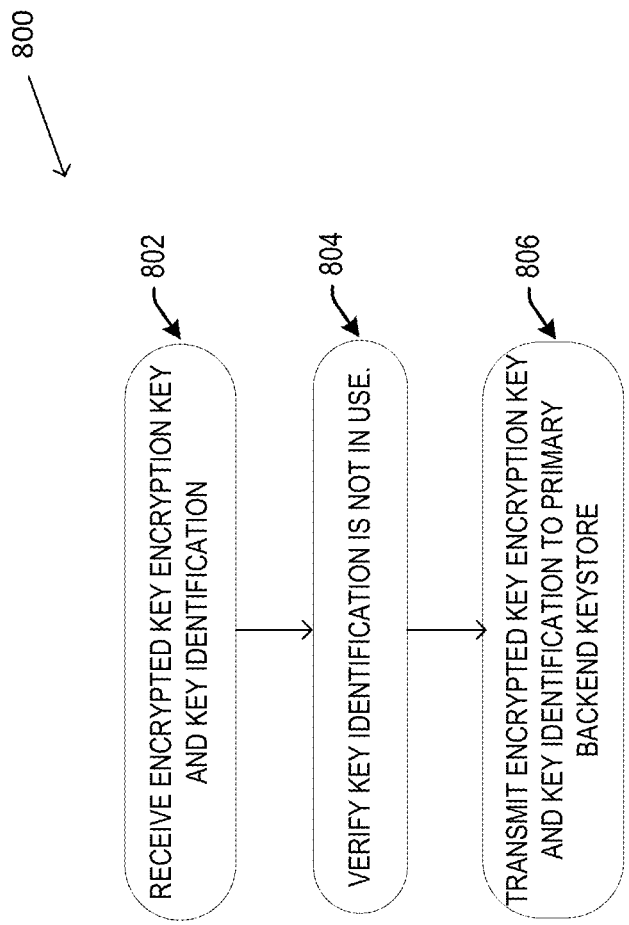
FIG. 8 is a block diagram illustrating an exemplary method for storing an encrypted key encryption key in a primary backend keystore by a control plane of a host, according to at least one embodiment.

Referring to FIG. 8, a block diagram 800 illustrating an example method for storing a key identification and encrypted KEK in a primary backend keystore by a control plane according to an embodiment is shown. At 802, a control plane of a host executing on a computing device cluster can receive an encrypted KEK, key identification, and instructions to store the key identification and the encrypted KEK. In some embodiments, a domain name system can direct the encrypted KEK, key identification, computing device identity, and the instructions to the control plane of the host. The control plane can receive the instructions and verify that the computing device is authorized to access the network. For example, the control plane can compare the identity with a list of computing devices authorized to access the network. At 804, the control plane can verify that the key identification is not already in use. In some embodiments, the control plane can scan a primary backend keystore that includes a table of key identifications to determine whether a key identification is already in use. If the key identification is already in use, the control plane can transmit an error message. If the key identification is not in use, the method proceeds to 806. At 806, the control plane can transmit the encrypted KEK and the key identification to the primary backend keystore. Upon receiving the key identification and encrypted KEK, the primary backend keystore can copy the key identification and encrypted KEK into a table.

Figure 9:
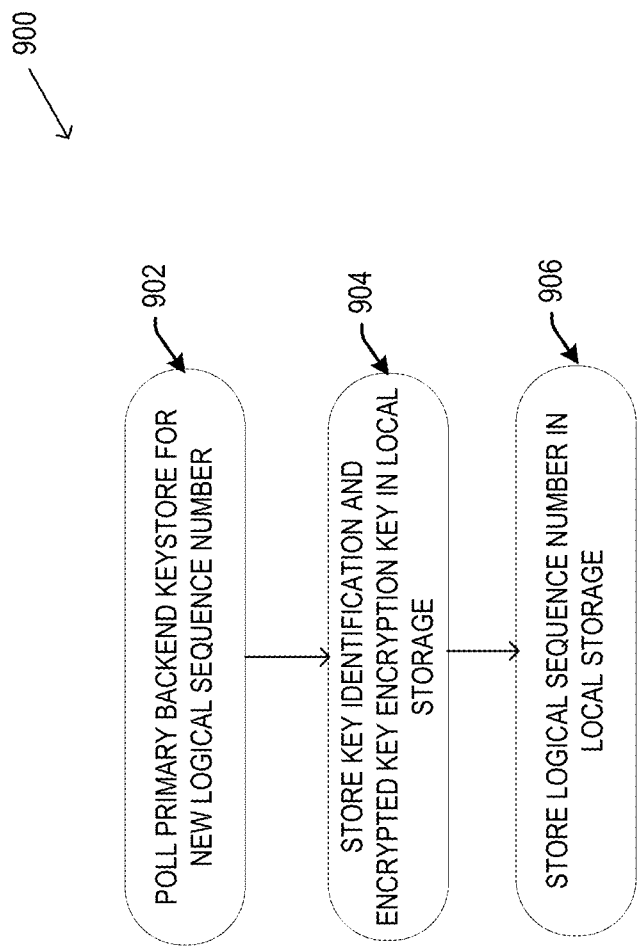
FIG. 9 is a block diagram illustrating an exemplary method for storing a key identification and an encrypted key encrypted key in local storage by a data plane of a host, according to at least one embodiment.

Referring to FIG. 9, a block diagram 900 illustrating an example method for storing a key identification and encrypted KEK in local storage by a data plane according to an embodiment is shown. At 902, a data plane of a host executing on a computing device cluster can poll the primary backend keystore for a new logical sequence number. In response to detecting a new logical sequence number, the data plane can read a write ahead log associated with the primary backend keystore and retrieve the associated key identification and encrypted KEK. The data plane and further store the associated key identification and encrypted KEK in the local storage of the host at 904. At 906, the data plane can further store the new logical sequence number in the local storage and associate it with the key identification and encrypted KEK.

Figure 10:
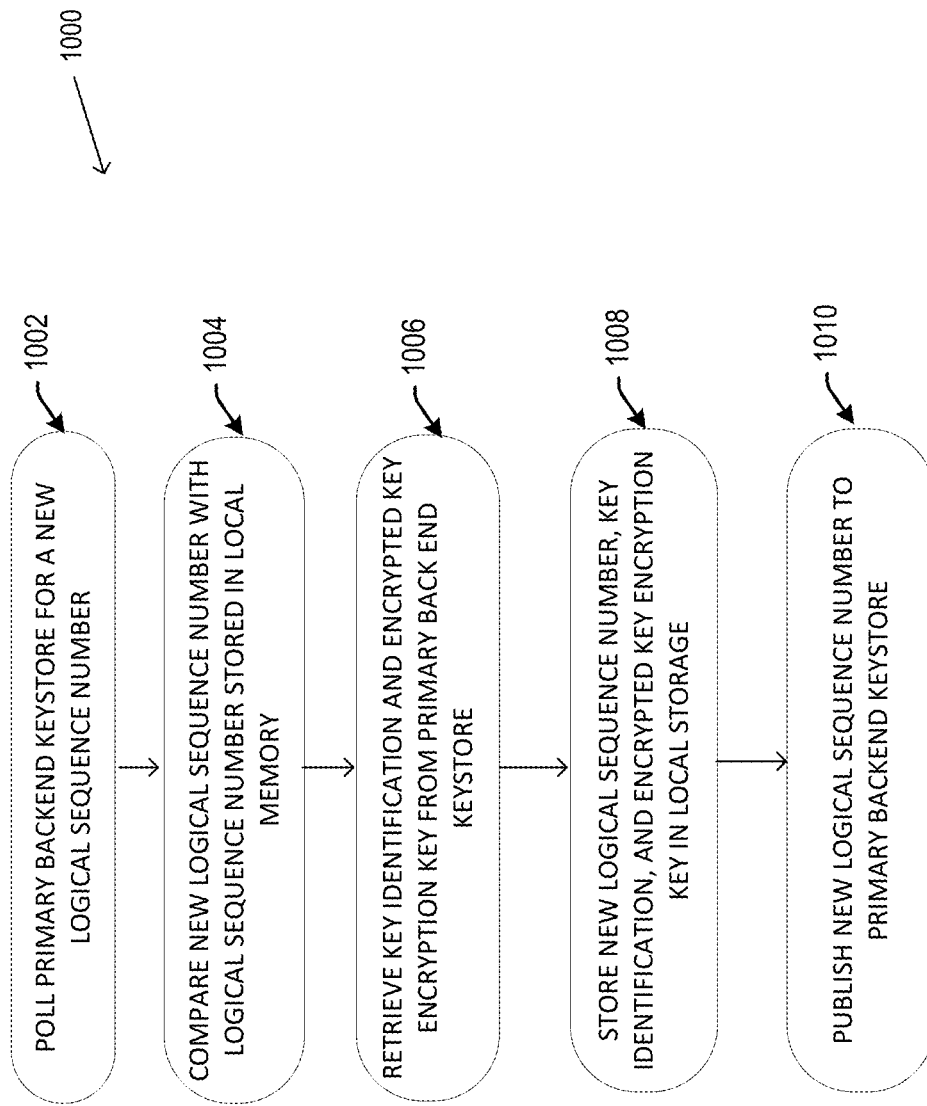
FIG. 10 is a block diagram illustrating an exemplary method for replicating a key identification and encrypted key encryption key by a data plane of a host, according to at least one embodiment.

Referring to FIG. 10, a block diagram 1000 illustrating an example method for replicating a key identification and encrypted KEK according to an embodiment is shown. It should be appreciated that replicating the key identification and encrypted KEK can be performed by all hosts in a computing device cluster, and not just the host that sent the instruction to store the key identification and encrypted KEK to the primary backend keystore. At 1002, a data plane of the host can poll a write ahead log of the primary backend keystore for any new logical sequence numbers. At 1004, in response to detecting a new logical sequence number, the data plane can compare the new logical sequence number with a logical sequence number stored at the host's local storage. If the new logical sequence number is the same as the previously stored highest logical sequence number, the data plane continues to query the write ahead log of the primary backend keystore periodically for any new logical sequence numbers.

At 1006, in response to determining that the new logical sequence number is different than the highest logical sequence number stored locally, the data plane can read the key identification and the encrypted KEK associated with the new logical sequence number from the write ahead log of the primary backend keystore. At 1008, the data plane can store the key identification and the encrypted KEK in the local storage of the host. The data plane can further replace the previously newest stored logical sequence number with this newest logical sequence number in the local storage. At 1010, the data plane can publish the stored new logical sequence number back to the primary backend keystore.

Figure 11:
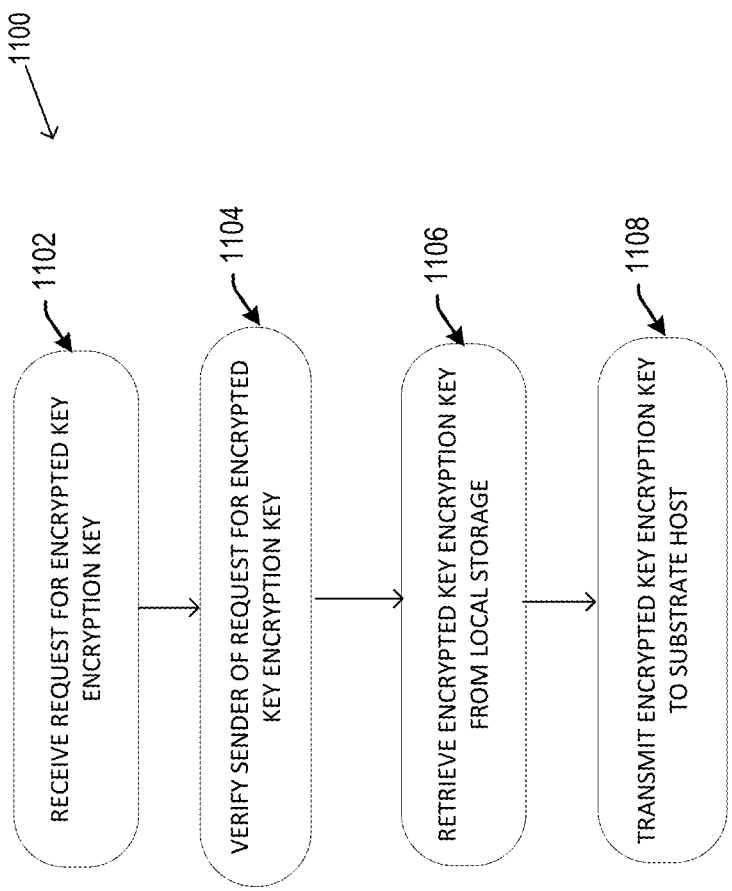
FIG. 11 is a block diagram illustrating an exemplary method for returning an encrypted key encryption key, according to at least one embodiment.

Referring to FIG. 11, a block diagram 1100 illustrating an example method for returning a key identification and encrypted KEK according to an embodiment is shown. At 1102, a data plane of a host executing on a network can receive a request for an encrypted KEK. At 1104, the data plane can verify that the request is transmitted from a computing device authorized to access the network's resources. In some embodiments, the request for the encrypted KEK can include an identity of the requesting computing device. The data plane can compare the identity with a list of known devices that are authorized to use the network's resources. If the identity is invalid, the request can be denied. If the identity is of an authorized device, the method proceeds to 1106. At 1106, the data plane can retrieve the encrypted KEK from the local storage of the host. In some embodiments, the request for the encrypted KEK includes an associated key identification. The local storage includes a table identifying encrypted KEKs and associated key identifications. The data plane can match the key identification included in the request with a key identification identified in the local storage. The data plane then retrieves the encrypted KEK from the local storage based on the match. At 1108, the data plane can return the encrypted KEK to the requesting computing device.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing, and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed may first need to be set up. In some instances, the provisioning can be done manually, a provisioning tool may be utilized to provision the resources, and/or deployment tools may be utilized to deploy the code once the infrastructure is provisioned.

Figure 12:
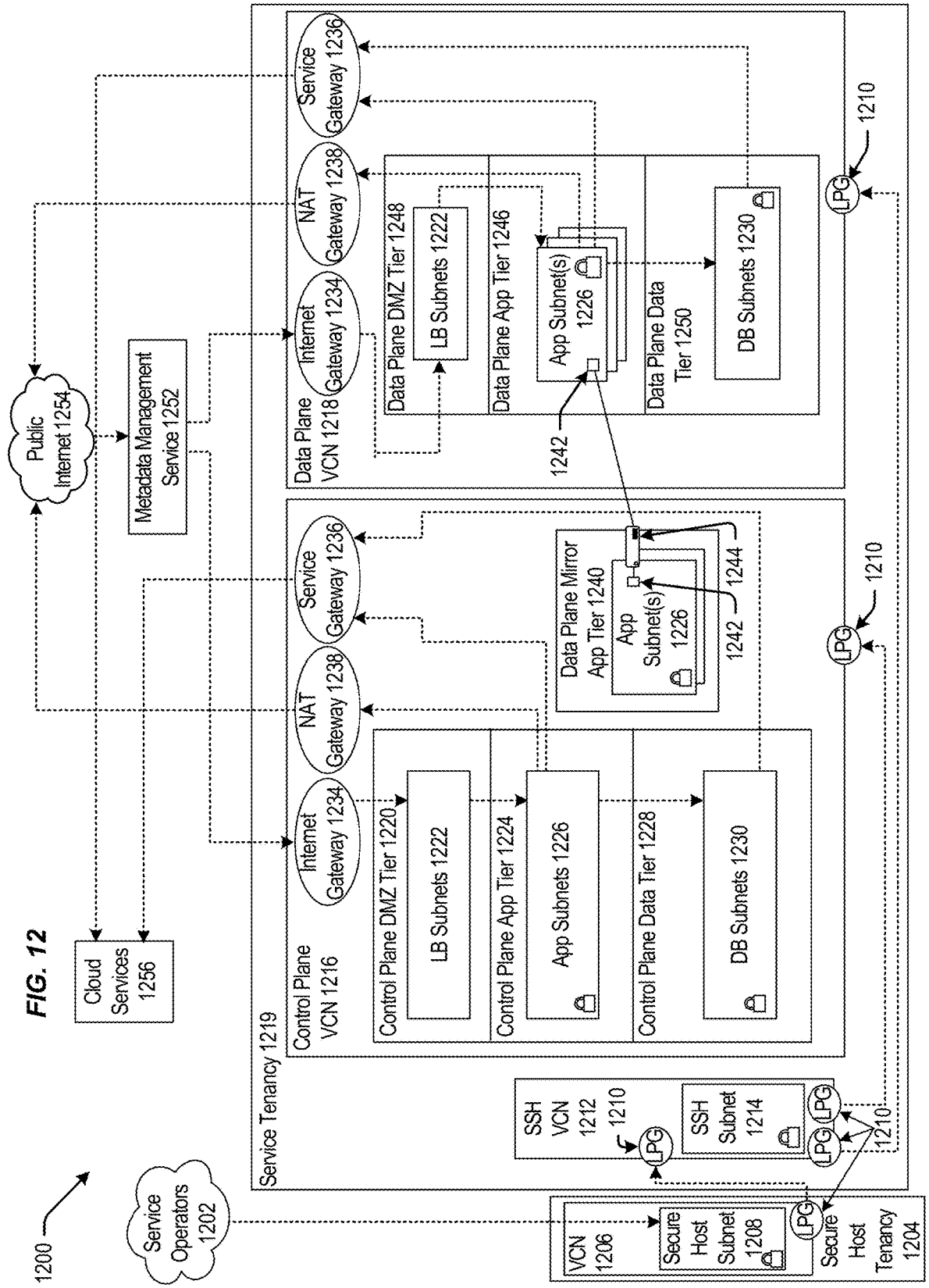
FIG. 12 is a block diagram illustrating a pattern for implementing a cloud infrastructure as a service system, according to at least one embodiment.

FIG. 12 is a block diagram 1200 illustrating an example pattern of an IaaS architecture, according to at least one embodiment. Service operators 1202 can be communicatively coupled to a secure host tenancy 1204 that can include a virtual cloud network (VCN) 1206 and a secure host subnet 1208. In some examples, the service operators 1202 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 14, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1206 and/or the Internet.

The VCN 1206 can include a local peering gateway (LPG) 1210 that can be communicatively coupled to a secure shell (SSH) VCN 1212 via an LPG 1210 contained in the SSH VCN 1212. The SSH VCN 1212 can include an SSH subnet 1214, and the SSH VCN 1212 can be communicatively coupled to a control plane VCN 1216 via the LPG 1210 contained in the control plane VCN 1216. Also, the SSH VCN 1212 can be communicatively coupled to a data plane VCN 1218 via an LPG 1210. The control plane VCN 1216 and the data plane VCN 1218 can be contained in a service tenancy 1219 that can be owned and/or operated by the IaaS provider.

The control plane VCN 1216 can include a control plane demilitarized zone (DMZ) tier 120 that acts as a perimeter network (e.g., portions of a corporate network between the corporate intranet and external networks). The DMZ-based servers may have restricted responsibilities and help keep breaches contained. Additionally, the DMZ tier 1220 can include one or more load balancer (LB) subnet(s) 1222, a control plane app tier 1224 that can include app subnet(s) 1226, a control plane data tier 1228 that can include database (DB) subnet(s) 1230 (e.g., frontend DB subnet(s) and/or backend DB subnet(s)). The LB subnet(s) 1222 contained in the control plane DMZ tier 1220 can be communicatively coupled to the app subnet(s) 1226 contained in the control plane app tier 1224 and an Internet gateway 1234 that can be contained in the control plane VCN 1216, and the app subnet(s) 1226 can be communicatively coupled to the DB subnet(s) 1230 contained in the control plane data tier 1228 and a service gateway 1236 and a network address translation (NAT) gateway 1238. The control plane VCN 1216 can include the service gateway 1236 and the NAT gateway 1238.

The control plane VCN 1216 can include a data plane mirror app tier 1240 that can include app subnet(s) 1226. The app subnet(s) 1226 contained in the data plane mirror app tier 1240 can include a virtual network interface controller (VNIC) 1242 that can execute a compute instance 1244. The compute instance 1244 can communicatively couple the app subnet(s) 1226 of the data plane mirror app tier 1240 to app subnet(s) 1226 that can be contained in a data plane app tier 1246.

The data plane VCN 1218 can include the data plane app tier 1246, a data plane DMZ tier 1248, and a data plane data tier 1250. The data plane DMZ tier 1248 can include LB subnet(s) 1222 that can be communicatively coupled to the app subnet(s) 1226 of the data plane app tier 1246 and the Internet gateway 1234 of the data plane VCN 1218. The app subnet(s) 1226 can be communicatively coupled to the service gateway 1236 of the data plane VCN 1218 and the NAT gateway 1238 of the data plane VCN 1218. The data plane data tier 1250 can also include the DB subnet(s) 1230 that can be communicatively coupled to the app subnet(s) 1226 of the data plane app tier 1246.

The Internet gateway 1234 of the control plane VCN 1216 and of the data plane VCN 1218 can be communicatively coupled to a metadata management service 1252 that can be communicatively coupled to public Internet 1254. Public Internet 1254 can be communicatively coupled to the NAT gateway 1238 of the control plane VCN 1216 and of the data plane VCN 1218. The service gateway 1236 of the control plane VCN 1216 and of the data plane VCN 1218 can be communicatively couple to cloud services 1256.

In some examples, the service gateway 1236 of the control plane VCN 1216 or of the data plane VCN 1218 can make application programming interface (API) calls to cloud services 1256 without going through public Internet 1254. The API calls to cloud services 1256 from the service gateway 1236 can be one-way: the service gateway 1236 can make API calls to cloud services 1256, and cloud services 1256 can send requested data to the service gateway 1236. But, cloud services 1256 may not initiate API calls to the service gateway 1236.

In some examples, the secure host tenancy 1204 can be directly connected to the service tenancy 1219, which may be otherwise isolated. The secure host subnet 1208 can communicate with the SSH subnet 1214 through an LPG 1210 that may enable two-way communication over an otherwise isolated system. Connecting the secure host subnet 1208 to the SSH subnet 1214 may give the secure host subnet 1208 access to other entities within the service tenancy 1219.

The control plane VCN 1216 may allow users of the service tenancy 1219 to set up or otherwise provision desired resources. Desired resources provisioned in the control plane VCN 1216 may be deployed or otherwise used in the data plane VCN 1218. In some examples, the control plane VCN 1216 can be isolated from the data plane VCN 1218, and the data plane mirror app tier 1240 of the control plane VCN 1216 can communicate with the data plane app tier 1246 of the data plane VCN 1218 via VNICs 1242 that can be contained in the data plane mirror app tier 1240 and the data plane app tier 1246.

In some examples, users of the system, or customers, can make requests, for example create, read, update, or delete (CRUD) operations, through public Internet 1254 that can communicate the requests to the metadata management service 1252. The metadata management service 1252 can communicate the request to the control plane VCN 1216 through the Internet gateway 1234. The request can be received by the LB subnet(s) 1222 contained in the control plane DMZ tier 1220. The LB subnet(s) 1222 may determine that the request is valid, and in response to this determination, the LB subnet(s) 1222 can transmit the request to app subnet(s) 1226 contained in the control plane app tier 1224. If the request is validated and requires a call to public Internet 1254, the call to public Internet 1254 may be transmitted to the NAT gateway 1238 that can make the call to public Internet 1254. Memory that may be desired to be stored by the request can be stored in the DB subnet(s) 1230.

In some examples, the data plane mirror app tier 1240 can facilitate direct communication between the control plane VCN 1216 and the data plane VCN 1218. For example, changes, updates, or other suitable modifications to configuration may be desired to be applied to the resources contained in the data plane VCN 1218. Via a VNIC 1242, the control plane VCN 1216 can directly communicate with, and can thereby execute the changes, updates, or other suitable modifications to configuration to, resources contained in the data plane VCN 1218.

In some embodiments, the control plane VCN 1216 and the data plane VCN 1218 can be contained in the service tenancy 1219. In this case, the user, or the customer, of the system may not own or operate either the control plane VCN 1216 or the data plane VCN 1218. Instead, the IaaS provider may own or operate the control plane VCN 1216 and the data plane VCN 1218, both of which may be contained in the service tenancy 1219. This embodiment can enable isolation of networks that may prevent users or customers from interacting with other users', or other customers', resources. Also, this embodiment may allow users or customers of the system to store databases privately without needing to rely on public Internet 1254, which may not have a desired level of threat prevention, for storage.

In other embodiments, the LB subnet(s) 1222 contained in the control plane VCN 1216 can be configured to receive a signal from the service gateway 1236. In this embodiment, the control plane VCN 1216 and the data plane VCN 1218 may be configured to be called by a customer of the IaaS provider without calling public Internet 1254. Customers of the IaaS provider may desire this embodiment since database(s) that the customers use may be controlled by the IaaS provider and may be stored on the service tenancy 1219, which may be isolated from public Internet 1254.

Figure 13:
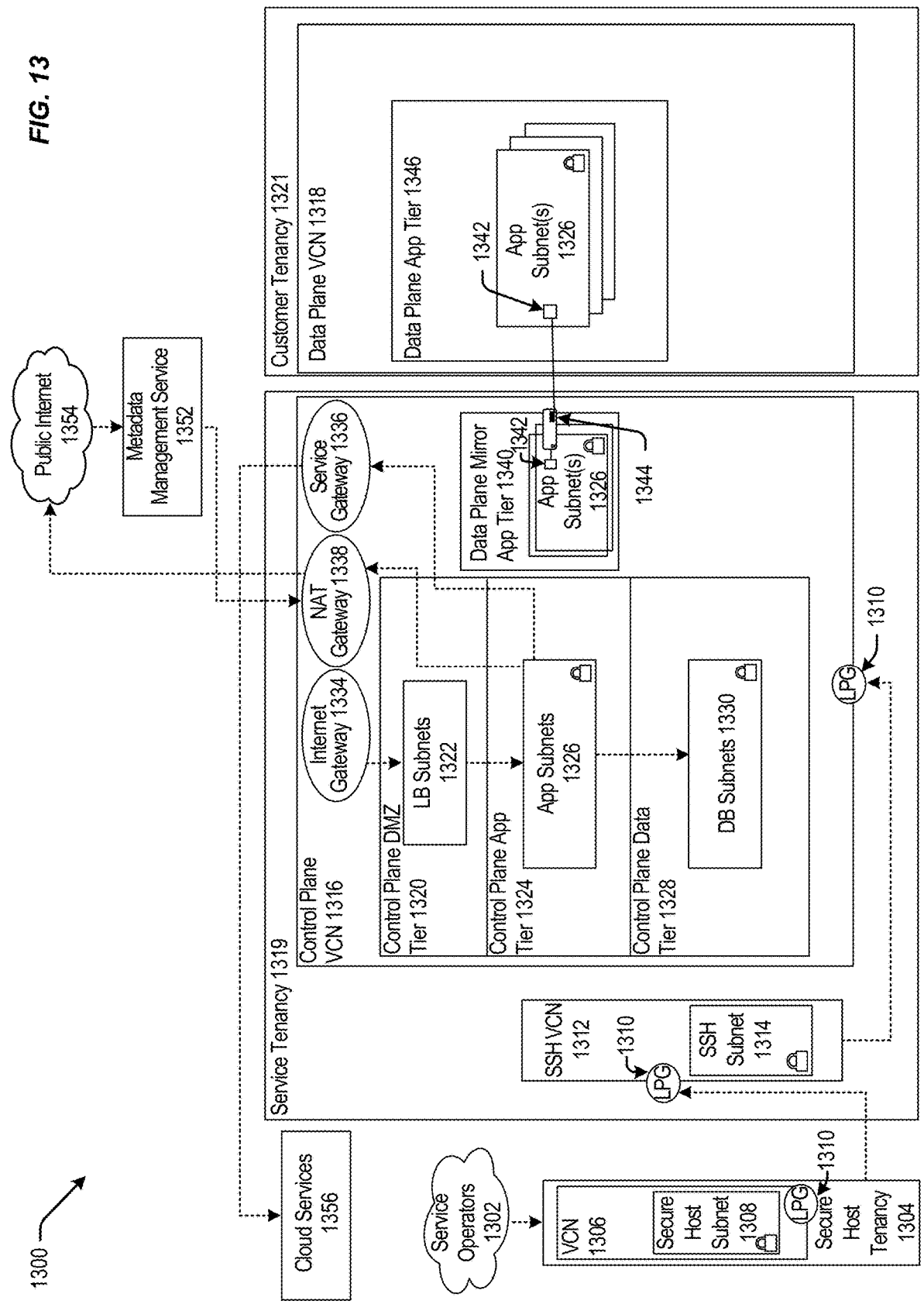
FIG. 13 is a block diagram illustrating another pattern for implementing a cloud infrastructure as a service system, according to at least one embodiment.

FIG. 13 is a block diagram 1300 illustrating another example pattern of an IaaS architecture, according to at least one embodiment. Service operators 1302 (e.g., service operators 1202 of FIG. 12) can be communicatively coupled to a secure host tenancy 1304 (e.g., the secure host tenancy 1204 of FIG. 12) that can include a virtual cloud network (VCN) 1306 (e.g., the VCN 1206 of FIG. 12) and a secure host subnet 1308 (e.g., the secure host subnet 1208 of FIG. 12). The VCN 1376 can include a local peering gateway (LPG) 1310 (e.g., the LPG 1210 of FIG. 12) that can be communicatively coupled to a secure shell (SSH) VCN 1312 (e.g., the SSH VCN 1212 of FIG. 12) via an LPG 1310 contained in the SSH VCN 1312. The SSH VCN 1312 can include an SSH subnet 1314 (e.g., the SSH subnet 1214 of FIG. 12), and the SSH VCN 1312 can be communicatively coupled to a control plane VCN 1316 (e.g., the control plane VCN 1216 of FIG. 12) via an LPG 1310 contained in the control plane VCN 1316. The control plane VCN 1316 can be contained in a service tenancy 1319 (e.g., the service tenancy 1219 of FIG. 12), and the data plane VCN 1318 (e.g., the data plane VCN 1218 of FIG. 12) can be contained in a customer tenancy 1321 that may be owned or operated by users, or customers, of the system.

The control plane VCN 1316 can include a control plane DMZ tier 1320 (e.g., the control plane DMZ tier 1220 of FIG. 12) that can include LB subnet(s) 1322 (e.g., LB subnet(s)122 of FIG. 12), a control plane app tier 1324 (e.g., the control plane app tier 1224 of FIG. 12) that can include app subnet(s) 1326 (e.g., app subnet(s)126 of FIG. 1), a control plane data tier 1328 (e.g., the control plane data tier 1228 of FIG. 12) that can include database (DB) subnet(s) 1330 (e.g., similar to DB subnet(s) 1230 of FIG. 12). The LB subnet(s) 1322 contained in the control plane DMZ tier 1320 can be communicatively coupled to the app subnet(s) 1326 contained in the control plane app tier 1324 and an Internet gateway 1334 (e.g., the Internet gateway 1234 of FIG. 12) that can be contained in the control plane VCN 1316, and the app subnet(s) 1326 can be communicatively coupled to the DB subnet(s) 1330 contained in the control plane data tier 1328 and a service gateway 1336 (e.g., the service gateway 1236 of FIG. 12) and a network address translation (NAT) gateway 1338 (e.g., the NAT gateway 1238 of FIG. 12). The control plane VCN 1316 can include the service gateway 1336 and the NAT gateway 1338.

The control plane VCN 1316 can include a data plane mirror app tier 1340 (e.g., the data plane mirror app tier 1240 of FIG. 12) that can include app subnet(s) 1326. The app subnet(s) 1326 contained in the data plane mirror app tier 1340 can include a virtual network interface controller (VNIC) 1342 (e.g., the VNIC of 1242 of FIG. 12) that can execute a compute instance 1344 (e.g., similar to the compute instance 1244 of FIG. 12). The compute instance 1344 can facilitate communication between the app subnet(s) 1326 of the data plane mirror app tier 1340 and the app subnet(s) 1326 that can be contained in a data plane app tier 1346 (e.g., the data plane app tier 1346 of FIG. 13) via the VNIC 1342 contained in the data plane mirror app tier 1340 and the VNIC 1342 contained in the data plane app tier 1346.

The Internet gateway 1334 contained in the control plane VCN 1316 can be communicatively coupled to a metadata management service 1352 (e.g., the metadata management service 1202 of FIG. 12) that can be communicatively coupled to public Internet 1354 (e.g., public Internet 1204 of FIG. 12). Public Internet 1354 can be communicatively coupled to the NAT gateway 1338 contained in the control plane VCN 1316. The service gateway 1336 contained in the control plane VCN 1316 can be communicatively couple to cloud services 1356 (e.g., cloud services 1256 of FIG. 12).

In some examples, the data plane VCN 1318 can be contained in the customer tenancy 1321. In this case, the IaaS provider may provide the control plane VCN 1316 for each customer, and the IaaS provider may, for each customer, set up a unique compute instance 1344 that is contained in the service tenancy 1319. Each compute instance 1344 may allow communication between the control plane VCN 1316, contained in the service tenancy 1319, and the data plane VCN 1318 that is contained in the customer tenancy 1321. The compute instance 1344 may allow resources, that are provisioned in the control plane VCN 1316 that is contained in the service tenancy 1319, to be deployed or otherwise used in the data plane VCN 1318 that is contained in the customer tenancy 1321.

In other examples, the customer of the IaaS provider may have databases that live in the customer tenancy 1321. In this example, the control plane VCN 1316 can include the data plane mirror app tier 1340 that can include app subnet(s) 1326. The data plane mirror app tier 1340 can reside in the data plane VCN 1318, but the data plane mirror app tier 1340 may not live in the data plane VCN 1318. That is, the data plane mirror app tier 1340 may have access to the customer tenancy 1321, but the data plane mirror app tier 1340 may not exist in the data plane VCN 1318 or be owned or operated by the customer of the IaaS provider. The data plane mirror app tier 1340 may be configured to make calls to the data plane VCN 1318 but may not be configured to make calls to any entity contained in the control plane VCN 1316. The customer may desire to deploy or otherwise use resources in the data plane VCN 1318 that are provisioned in the control plane VCN 1316, and the data plane mirror app tier 1340 can facilitate the desired deployment, or other usage of resources, of the customer.

In some embodiments, the customer of the IaaS provider can apply filters to the data plane VCN 1318. In this embodiment, the customer can determine what the data plane VCN 1318 can access, and the customer may restrict access to public Internet 1354 from the data plane VCN 1318. The IaaS provider may not be able to apply filters or otherwise control access of the data plane VCN 1318 to any outside networks or databases. Applying filters and controls by the customer onto the data plane VCN 1318, contained in the customer tenancy 1321, can help isolate the data plane VCN 1318 from other customers and from public Internet 1354.

In some embodiments, cloud services 1356 can be called by the service gateway 1336 to access services that may not exist on public Internet 1354, on the control plane VCN 1316, or on the data plane VCN 1318. The connection between cloud services 1356 and the control plane VCN 1316 or the data plane VCN 1318 may not be live or continuous. Cloud services 1356 may exist on a different network owned or operated by the IaaS provider. Cloud services 1356 may be configured to receive calls from the service gateway 1336 and may be configured to not receive calls from public Internet 1354. Some cloud services 1356 may be isolated from other cloud services 1356, and the control plane VCN 1316 may be isolated from cloud services 1356 that may not be in the same region as the control plane VCN 1316. For example, the control plane VCN 1316 may be located in "Region 1," and cloud service "Deployment 1," may be located in Region 1 and in "Region 2." If a call to Deployment 1 is made by the service gateway 1336 contained in the control plane VCN 1316 located in Region 1, the call may be transmitted to Deployment 1 in Region 1. In this example, the control plane VCN 1316, or Deployment 1 in Region 1, may not be communicatively coupled to, or otherwise in communication with, Deployment 2 in Region 2.

Figure 14:
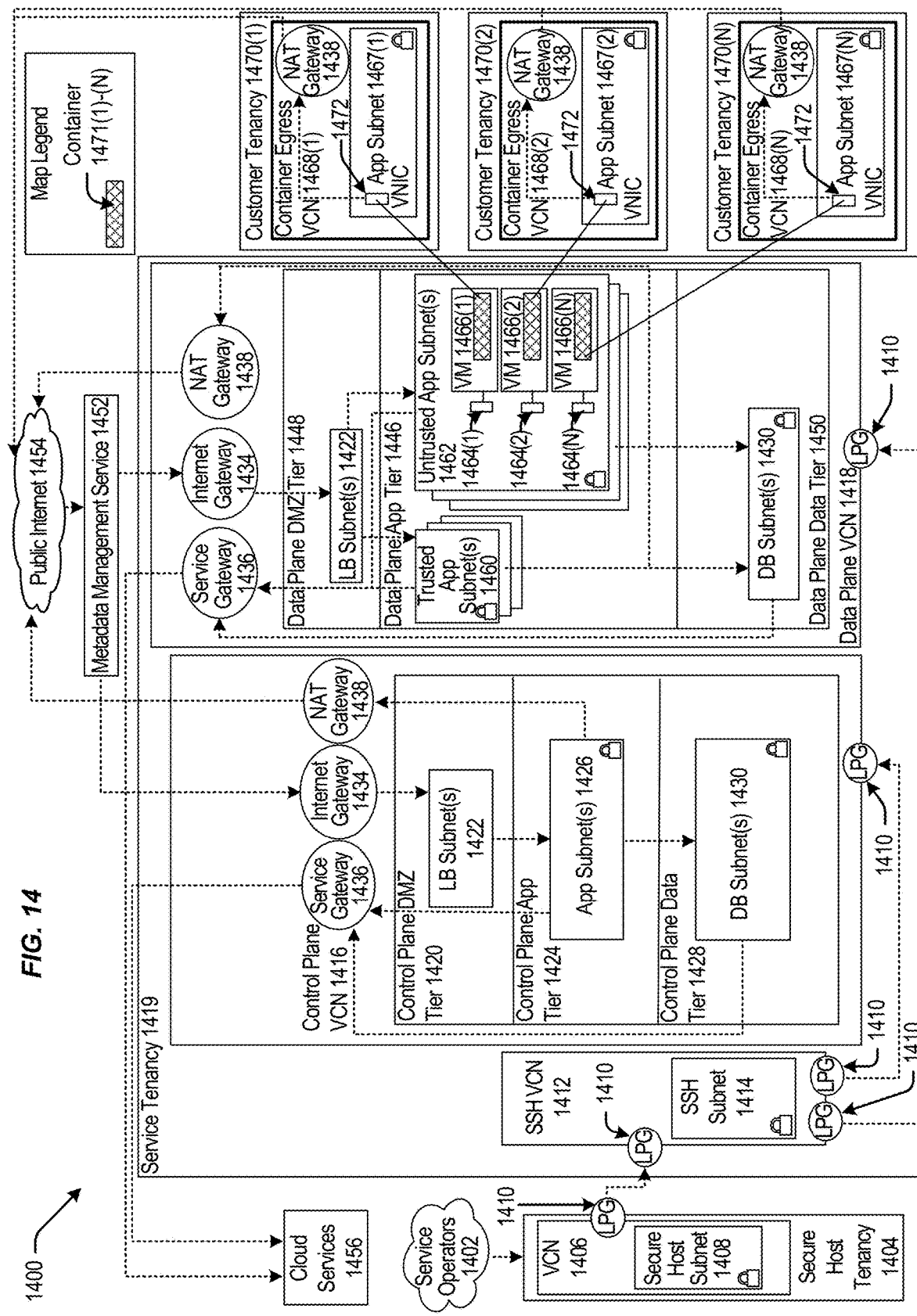
FIG. 14 is a block diagram illustrating another pattern for implementing a cloud infrastructure as a service system, according to at least one embodiment.

FIG. 14 is a block diagram 1400 illustrating another example pattern of an IaaS architecture, according to at least one embodiment. Service operators 1402 (e.g., service operators 1202 of FIG. 12) can be communicatively coupled to a secure host tenancy 1404 (e.g., the secure host tenancy 1204 of FIG. 12) that can include a virtual cloud network (VCN) 1406 (e.g., the VCN 1406 of FIG. 12) and a secure host subnet 1408 (e.g., the secure host subnet 1208 of FIG. 12). The VCN 1406 can include an LPG 1410 (e.g., the LPG 1210 of FIG. 12) that can be communicatively coupled to an SSH VCN 1412 (e.g., the SSH VCN 1212 of FIG. 12) via an LPG 1410 contained in the SSH VCN 1412. The SSH VCN 1412 can include an SSH subnet 1414 (e.g., the SSH subnet 1214 of FIG. 12), and the SSH VCN 1412 can be communicatively coupled to a control plane VCN 1416 (e.g., the control plane VCN 1216 of FIG. 12) via an LPG 1410 contained in the control plane VCN 1416 and to a data plane VCN 1418 (e.g., the data plane 1218 of FIG. 12) via an LPG 1410 contained in the data plane VCN 1418. The control plane VCN 1416 and the data plane VCN 1418 can be contained in a service tenancy 1419 (e.g., the service tenancy 1219 of FIG. 12).

The control plane VCN 1416 can include a control plane DMZ tier 1420 (e.g., the control plane DMZ tier 1220 of FIG. 12) that can include load balancer (LB) subnet(s) 1422 (e.g., LB subnet(s)122 of FIG. 12), a control plane app tier 1424 (e.g., the control plane app tier 1224 of FIG. 12) that can include app subnet(s) 1426 (e.g., similar to app subnet(s)126 of FIG. 12), a control plane data tier 1428 (e.g., the control plane data tier 1228 of FIG. 12) that can include DB subnet(s) 1430. The LB subnet(s) 1422 contained in the control plane DMZ tier 1420 can be communicatively coupled to the app subnet(s) 1426 contained in the control plane app tier 1424 and to an Internet gateway 1434 (e.g., the Internet gateway 1234 of FIG. 12) that can be contained in the control plane VCN 1416, and the app subnet(s) 1426 can be communicatively coupled to the DB subnet(s) 1430 contained in the control plane data tier 1428 and to a service gateway 1436 (e.g., the service gateway of FIG. 12) and a network address translation (NAT) gateway 1438 (e.g., the NAT gateway 1238 of FIG. 12). The control plane VCN 1416 can include the service gateway 1436 and the NAT gateway 1438.

The data plane VCN 1418 can include a data plane app tier 1446 (e.g., the data plane app tier 1246 of FIG. 12), a data plane DMZ tier 1448 (e.g., the data plane DMZ tier 1248 of FIG. 12), and a data plane data tier 1450 (e.g., the data plane data tier 1250 of FIG. 12). The data plane DMZ tier 1448 can include LB subnet(s) 1422 that can be communicatively coupled to trusted app subnet(s) 1460 and untrusted app subnet(s) 1462 of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include one or more primary VNICs 1464(1)-(N) that can be communicatively coupled to tenant virtual machines (VMs) 1466(1)-(N). Each tenant VM 1466(1)-(N) can be communicatively coupled to a respective app subnet 1467(1)-(N) that can be contained in respective container egress VCNs 1468(1)-(N) that can be contained in respective customer tenancies 1470(1)-(N). Respective secondary VNICs 1472(1)-(N) can facilitate communication between the untrusted app subnet(s) 1462 contained in the data plane VCN 1418 and the app subnet contained in the container egress VCNs 1468(1)-(N). Each container egress VCNs 1468(1)-(N) can include a NAT gateway 1438 that can be communicatively coupled to public Internet 1454 (e.g., public Internet 1254 of FIG. 12). The Internet gateway 1434 contained in the control plane VCN 1416 and contained in the data plane VCN 1418 can be communicatively coupled to a metadata management service 1452 (e.g., the metadata management system 1252 of FIG. 12) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some embodiments, the data plane VCN 1418 can be integrated with customer tenancies 1470. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1446. Code to run the function may be executed in the VMs 1466(1)-(N), and the code may not be configured to run anywhere else on the data plane VCN 1418. Each VM 1466(1)-(N) may be connected to one customer tenancy 1470. Respective containers 1471(1)-(N) contained in the VMs 1466(1)-(N) may be configured to run the code. In this case, there can be a dual isolation (e.g., the containers 1471(1)-(N) running code, where the containers 1471(1)-(N) may be contained in at least the VM 1466(1)-(N) that are contained in the untrusted app subnet(s) 1462), which may help prevent incorrect or otherwise undesirable code from damaging the network of the IaaS provider or from damaging a network of a different customer. The containers 1471

(1)-(N) may be communicatively coupled to the customer tenancy 1470 and may be configured to transmit or receive data from the customer tenancy 1470. The containers 1471(1)-(N) may not be configured to transmit or receive data from any other entity in the data plane VCN 1418. Upon completion of running the code, the IaaS provider may kill or otherwise dispose of the containers 1471(1)-(N).

In some embodiments, the trusted app subnet(s) 1460 may run code that may be owned or operated by the IaaS provider. In this embodiment, the trusted app subnet(s) 1460 may be communicatively coupled to the DB subnet(s) 1430 and be configured to execute CRUD operations in the DB subnet(s) 1430. The untrusted app subnet(s) 1462 may be communicatively coupled to the DB subnet(s) 1430, but in this embodiment, the untrusted app subnet(s) may be configured to execute read operations in the DB subnet(s) 1430. The containers 1471(1)-(N) that can be contained in the VM 1466(1)-(N) of each customer and that may run code from the customer may not be communicatively coupled with the DB subnet(s) 1430.

In other embodiments, the control plane VCN 1416 and the data plane VCN 1418 may not be directly communicatively coupled. In this embodiment, there may be no direct communication between the control plane VCN 1416 and the data plane VCN 1418. However, communication can occur indirectly through at least one method. An LPG 1410 may be established by the IaaS provider that can facilitate communication between the control plane VCN 1416 and the data plane VCN 1418. In another example, the control plane VCN 1416 or the data plane VCN 1418 can make a call to cloud services 1456 via the service gateway 1436. For example, a call to cloud services 1456 from the control plane VCN 1416 can include a request for a service that can communicate with the data plane VCN 1418.

Figure 15:
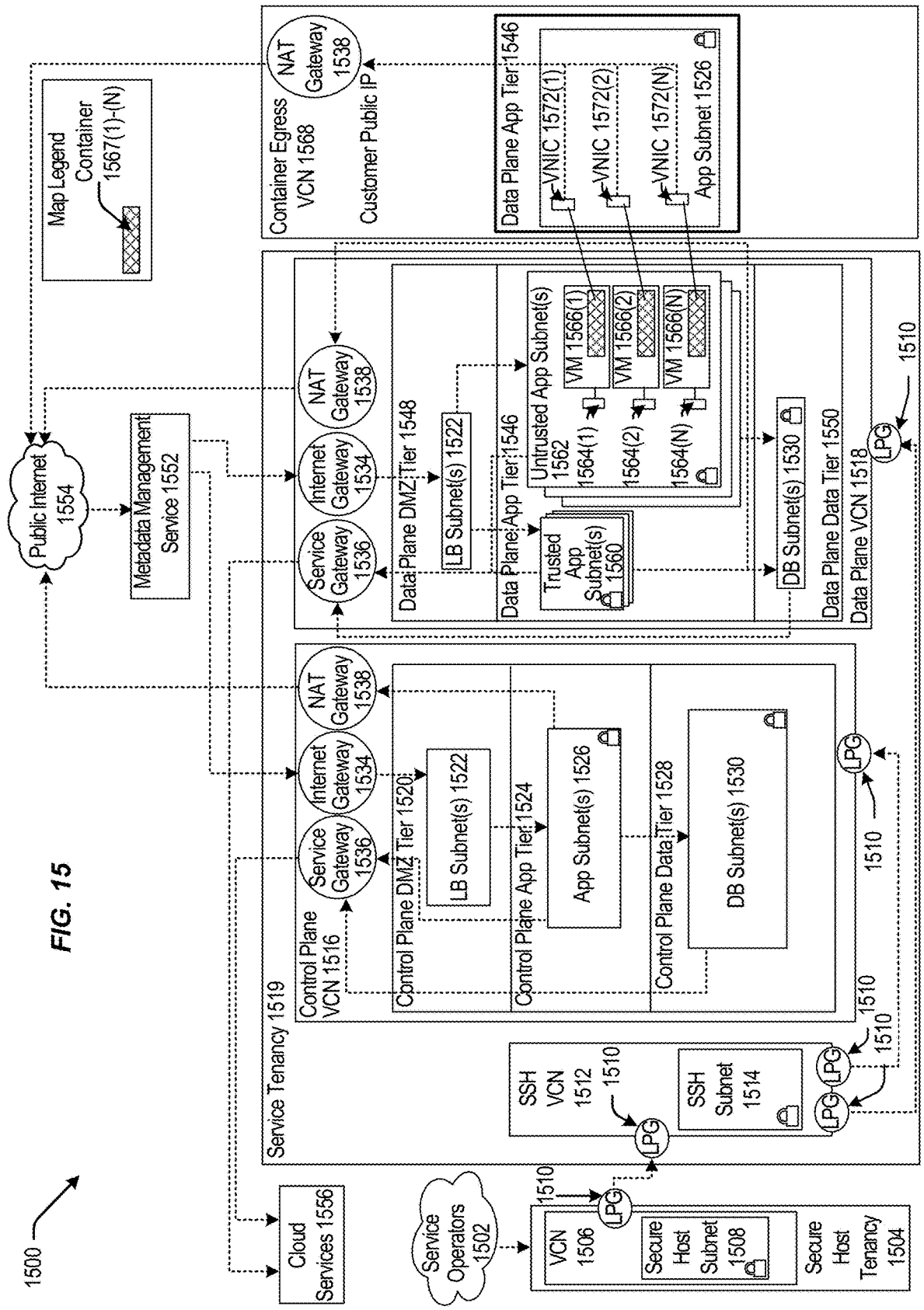
FIG. 15 is a block diagram illustrating another pattern for implementing a cloud infrastructure as a service system, according to at least one embodiment.

FIG. 15 is a block diagram 1500 illustrating another example pattern of an IaaS architecture, according to at least one embodiment. Service operators 1502 (e.g., service operators 1202 of FIG. 12) can be communicatively coupled to a secure host tenancy 1504 (e.g., the secure host tenancy 1204 of FIG. 12) that can include a virtual cloud network (VCN) 1506 (e.g., the VCN 1206 of FIG. 12) and a secure host subnet 1508 (e.g., the secure host subnet 1208 of FIG. 12). The VCN 1506 can include an LPG 1510 (e.g., the LPG 1210 of FIG. 12) that can be communicatively coupled to an SSH VCN 1512 (e.g., the SSH VCN 1212 of FIG. 12) via an LPG 1510 contained in the SSH VCN 1512. The SSH VCN 1512 can include an SSH subnet 1514 (e.g., the SSH subnet 1214 of FIG. 12), and the SSH VCN 1512 can be communicatively coupled to a control plane VCN 1516 (e.g., the control plane VCN 1216 of FIG. 12) via an LPG 1510 contained in the control plane VCN 1516 and to a data plane VCN 1518 (e.g., the data plane 1218 of FIG. 12) via an LPG 1510 contained in the data plane VCN 1518. The control plane VCN 1516 and the data plane VCN 1518 can be contained in a service tenancy 1519 (e.g., the service tenancy 1219 of FIG. 12).

The control plane VCN 1516 can include a control plane DMZ tier 1520 (e.g., the control plane DMZ tier 1220 of FIG. 12) that can include LB subnet(s) 1522 (e.g., LB subnet(s)122 of FIG. 12), a control plane app tier 1524 (e.g., the control plane app tier 1224 of FIG. 12) that can include app subnet(s) 1526 (e.g., app subnet(s)126 of FIG. 12), a control plane data tier 1528 (e.g., the control plane data tier 1228 of FIG. 12) that can include DB subnet(s) 1530 (e.g., DB subnet(s)130 of FIG. 12). The LB subnet(s) 1522 contained in the control plane DMZ tier 1520 can be communicatively coupled to the app subnet(s) 1526 contained in the control plane app tier 1524 and to an Internet gateway 1534 (e.g., the Internet gateway 1234 of FIG. 12) that can be contained in the control plane VCN 1516, and the app subnet(s) 1526 can be communicatively coupled to the DB subnet(s) 1530 contained in the control plane data tier 1528 and to a service gateway 1536 (e.g., the service gateway 1236 of FIG. 12) and a network address translation (NAT) gateway 1238 (e.g., the NAT gateway 1238 of FIG. 12). The control plane VCN 1516 can include the service gateway 1536 and the NAT gateway 1538.

The data plane VCN 1518 can include a data plane app tier 1546 (e.g., the data plane app tier 1246 of FIG. 12), a data plane DMZ tier 1548 (e.g., the data plane DMZ tier 1248 of FIG. 12), and a data plane data tier 1550 (e.g., the data plane data tier 1250 of FIG. 12). The data plane DMZ tier 1548 can include LB subnet(s) 1522 that can be communicatively coupled to trusted app subnet(s) 1560 (e.g., trusted app subnet(s) 1460 of FIG. 14) and untrusted app subnet(s) 1562 (e.g., untrusted app subnet(s) 1462 of FIG. 14) of the data plane app tier 1546 and the Internet gateway 1534 contained in the data plane VCN 1518. The trusted app subnet(s) 1560 can be communicatively coupled to the service gateway 1536 contained in the data plane VCN 1518, the NAT gateway 1538 contained in the data plane VCN 1518, and DB subnet(s) 1530 contained in the data plane data tier 1550. The untrusted app subnet(s) 1562 can be communicatively coupled to the service gateway 1536 contained in the data plane VCN 1518 and DB subnet(s) 1530 contained in the data plane data tier 1550. The data plane data tier 1550 can include DB subnet(s) 1530 that can be communicatively coupled to the service gateway 1536 contained in the data plane VCN 1518.

The untrusted app subnet(s) 1562 can include primary VNICs 1564(1)-(N) that can be communicatively coupled to tenant virtual machines (VMs) 1566(1)-(N) residing within the untrusted app subnet(s) 1562. Each tenant VM 1566(1)-(N) can run code in a respective container 1567(1)-(N), and be communicatively coupled to an app subnet 1526 that can be contained in a data plane app tier 1546 that can be contained in a container egress VCN 1568. Respective secondary VNICs 1572(1)-(N) can facilitate communication between the untrusted app subnet(s) 1562 contained in the data plane VCN 1518 and the app subnet contained in the container egress VCN 1568. The container egress VCN can include a NAT gateway 1538 that can be communicatively coupled to public Internet 1554 (e.g., public Internet154 of FIG. 1).

The Internet gateway 1534 contained in the control plane VCN 1516 and contained in the data plane VCN 1518 can be communicatively coupled to a metadata management service 1552 (e.g., the metadata management system 1252 of FIG. 12) that can be communicatively coupled to public Internet 1554. Public Internet 1554 can be communicatively coupled to the NAT gateway 1538 contained in the control plane VCN 1516 and contained in the data plane VCN 1518. The service gateway 1536 contained in the control plane VCN 1516 and contained in the data plane VCN 1518 can be communicatively couple to cloud services 1556.

In some examples, the pattern illustrated by the architecture of block diagram 1500 of FIG. 15 may be considered an exception to the pattern illustrated by the architecture of block diagram 1400 of FIG. 14 and may be desirable for a customer of the IaaS provider if the IaaS provider cannot directly communicate with the customer (e.g., a disconnected region). The respective containers 1567(1)-(N) that are contained in the VMs 1566(1)-(N) for each customer can be accessed in real-time by the customer. The containers 1567(1)-(N) may be configured to make calls to respective secondary VNICs 1572(1)-(N) contained in app subnet(s) 1526 of the data plane app tier 1546 that can be contained in the container egress VCN 1568. The secondary VNICs 1572(1)-(N) can transmit the calls to the NAT gateway 1538 that may transmit the calls to public Internet 1554. In this example, the containers 1567(1)-(N) that can be accessed in real-time by the customer can be isolated from the control plane VCN 1516 and can be isolated from other entities contained in the data plane VCN 1518. The containers 1567(1)-(N) may also be isolated from resources from other customers.

In other examples, the customer can use the containers 1567(1)-(N) to call cloud services 1556. In this example, the customer may run code in the containers 1567(1)-(N) that requests a service from cloud services 1556. The containers 1567(1)-(N) can transmit this request to the secondary VNICs 1572(1)-(N) that can transmit the request to the NAT gateway that can transmit the request to public Internet 1554. Public Internet 1554 can transmit the request to LB subnet(s) 1522 contained in the control plane VCN 1516 via the Internet gateway 1534. In response to determining the request is valid, the LB subnet(s) can transmit the request to app subnet(s) 1526 that can transmit the request to cloud services 1556 via the service gateway 1536.

It should be appreciated that IaaS architectures 1200, 1300, 1400, 1500 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 16:
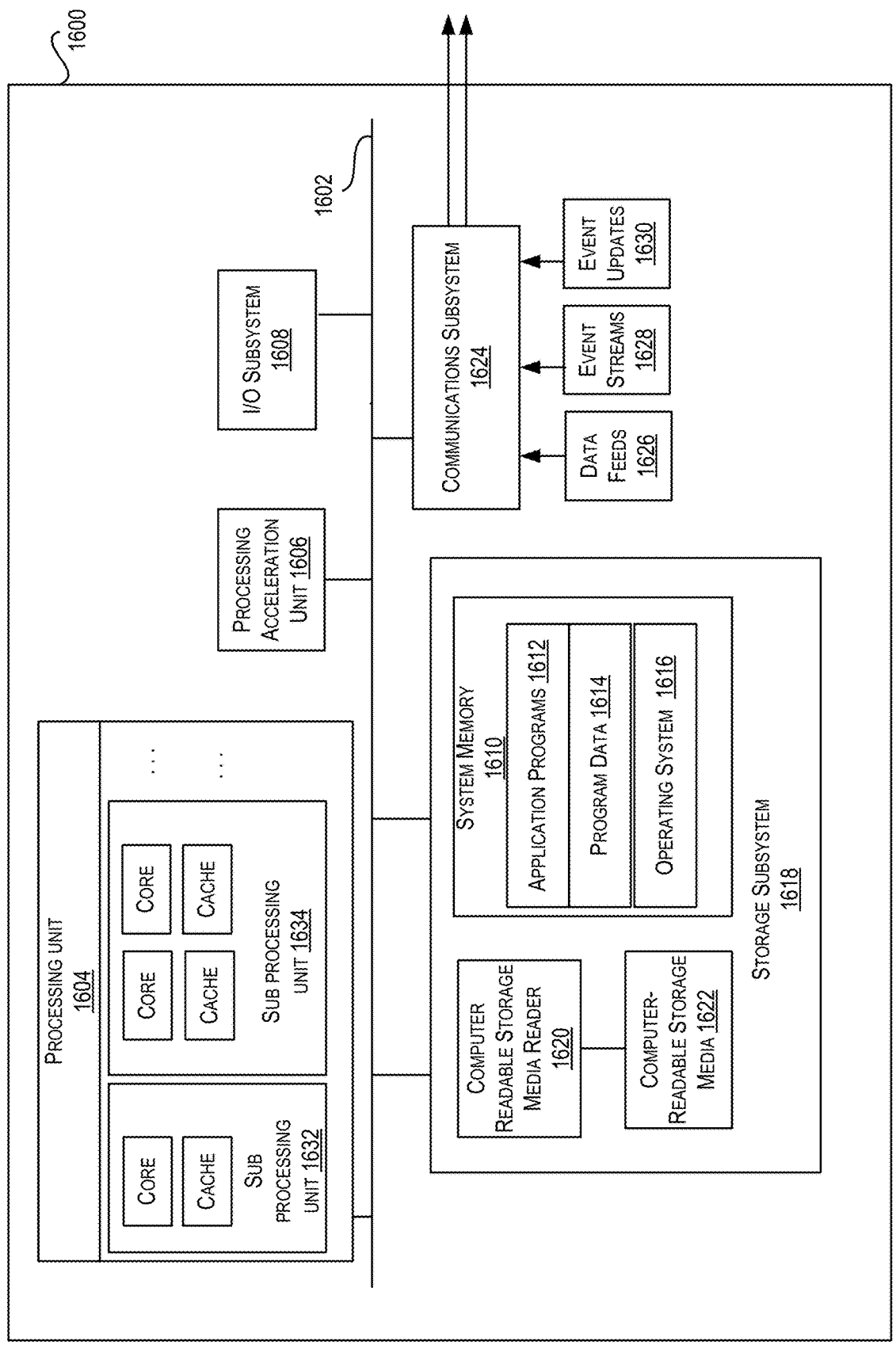
FIG. 16 is a block diagram illustrating an example computer system, according to at least one embodiment.

FIG. 16 illustrates an example computer system 1600, in which various embodiments may be implemented. The system 1600 may be used to implement any of the computer systems described above. As shown in the figure, computer system 1600 includes a processing unit 1604 that communicates with a number of peripheral subsystems via a bus subsystem 1602. These peripheral subsystems may include a processing acceleration unit 1606, an I/O subsystem 1608, a storage subsystem 1618 and a communications subsystem 1624. Storage subsystem 1618 includes tangible computer-readable storage media 1622 and a system memory 1610.

Bus subsystem 1602 provides a mechanism for letting the various components and subsystems of computer system 1600 communicate with each other as intended. Although bus subsystem 1602 is shown schematically as a single bus, alternative embodiments of the bus subsystem may utilize multiple buses. Bus subsystem 1602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1604, which can be implemented as one or more integrated circuits (e.g., a conventional microprocessor or microcontroller), controls the operation of computer system 1600. One or more processors may be included in processing unit 1604. These processors may include single core or multicore processors. In certain embodiments, processing unit 1604 may be implemented as one or more independent processing units 1632 and/or 1634 with single or multicore processors included in each processing unit. In other embodiments, processing unit 1604 may also be implemented as a quad-core processing unit formed by integrating two dual-core processors into a single chip.

In various embodiments, processing unit 1604 can execute a variety of programs in response to program code and can maintain multiple concurrently executing programs or processes. At any given time, some or all of the program code to be executed can be resident in processor(s) 1604 and/or in storage subsystem 1618. Through suitable programming, processor(s) 1604 can provide various functionalities described above. Computer system 1600 may additionally include a processing acceleration unit 1606, which can include a digital signal processor (DSP), a special-purpose processor, and/or the like.

I/O subsystem 1608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 1460 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 14D scanners, 14D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1600 may comprise a storage subsystem 1618 that comprises software elements, shown as being currently located within a system memory 1610. System memory 1610 may store program instructions that are loadable and executable on processing unit 1604, as well as data generated during the execution of these programs.

Depending on the configuration and type of computer system 1600, system memory 1610 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1604. In some implementations, system memory 1610 may include multiple different types of memory, such as static random access memory (SRAM) or dynamic random access memory (DRAM). In some implementations, a basic input/output system (BIOS), containing the basic routines that help to transfer information between elements within computer system 1600, such as during start-up, may typically be stored in the ROM. By way of example, and not limitation, system memory 1610 also illustrates application programs 1612, which may include client applications, Web browsers, mid-tier applications, relational database management systems (RDBMS), etc., program data 1614, and an operating system 1616. By way of example, operating system 1616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 1618 may also provide a tangible computer-readable storage medium for storing the basic programming and data constructs that provide the functionality of some embodiments. Software (programs, code modules, instructions) that when executed by a processor provide the functionality described above may be stored in storage subsystem 1618. These software modules or instructions may be executed by processing unit 1604. Storage subsystem 1618 may also provide a repository for storing data used in accordance with the present disclosure.

Storage subsystem 1600 may also include a computer-readable storage media reader 1620 that can further be connected to computer-readable storage media 1622. Together and, optionally, in combination with system memory 1610, computer-readable storage media 1622 may comprehensively represent remote, local, fixed, and/or removable storage devices plus storage media for temporarily and/or more permanently containing, storing, transmitting, and retrieving computer-readable information.

Computer-readable storage media 1622 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer-readable media. This can also include nontangible computer-readable media, such as data signals, data transmissions, or any other medium which can be used to transmit the desired information and which can be accessed by computing system 1600.

By way of example, computer-readable storage media 1622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1622 may include, but is not limited to, Zip® drives, flash memory cards, universal serial bus (USB) flash drives, secure digital (SD) cards, DVD disks, digital video tape, and the like. Computer-readable storage media 1622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1600.

Communications subsystem 1624 provides an interface to other computer systems and networks. Communications subsystem 1624 serves as an interface for receiving data from and transmitting data to other systems from computer system 1600. For example, communications subsystem 1624 may enable computer system 1600 to connect to one or more devices via the Internet. In some embodiments communications subsystem 1624 can include radio frequency (RF) transceiver components for accessing wireless voice and/or data networks (e.g., using cellular telephone technology, advanced data network technology, such as 14G, 15G or EDGE (enhanced data rates for global evolution), WiFi (IEEE 1402.11 family standards, or other mobile communication technologies, or any combination thereof), global positioning system (GPS) receiver components, and/or other components. In some embodiments communications subsystem 1624 can provide wired network connectivity (e.g., Ethernet) in addition to or instead of a wireless interface.

In some embodiments, communications subsystem 1624 may also receive input communication in the form of structured and/or unstructured data feeds 1626, event streams 1628, event updates 1630, and the like on behalf of one or more users who may use computer system 1600.

By way of example, communications subsystem 1624 may be configured to receive data feeds 1626 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1624 may also be configured to receive data in the form of continuous data streams, which may include event streams 1628 of real-time events and/or event updates 1630, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1624 may also be configured to output the structured and/or unstructured data feeds 1626, event streams 1628, event updates 1630, and the like to one or more databases that may be in communication with one or more streaming data source computers coupled to computer system 1600.

Computer system 1600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, the method comprising:
   receiving, by a computing device of a cloud computing system, a key identification, an encrypted key-encryption key, an identity of a client device, and a request from the client device to store the key identification and the encrypted key-encryption key, wherein the encrypted key-encryption key is generated by encrypting a key-encryption key;
   verifying, by a control plane of the computing device, the request based at least in part on:
      validating the identity of the client device, and
      validating whether the client device is authorized to store the key identification and encrypted key-encryption key;
   transmitting, by the control plane of the computing device and based at least in part on verifying the request, the key identification, the encrypted key-encryption key, and the request to store the key identification and the encrypted key-encryption key to a keystore,
   wherein a logical sequence number is generated based on the request to store the key identification and the encrypted key-encryption key;
   polling, by a data plane of the computing device, the keystore for the logical sequence number and the encrypted key-encryption key;
   reading, by the data plane of the computing device and in response to detecting the logical sequence number, the key identification and the encrypted key-encryption key from the keystore;
   storing, by the data plane of the computing device, the logical sequence number, the key identification, and the encrypted key-encryption key in a storage of the computing device; and
   transmitting, by the data plane of the computing device, the stored logical sequence number to the keystore.

2. The computer-implemented method of claim 1, wherein verifying the authority of the client device comprises:
   receiving, by a control plane of the computing device, the identity of the client device; and
   verifying, by the control plane of the computing device, the authority of the client device by comparing the identity of the client device to a list of authorized client devices.

3. The computer-implemented method of claim 1, wherein reading the key identification and the encrypted key-encryption key from the keystore comprises reading the key identification and the encrypted key-encryption key from a write ahead log of the keystore based at least in part on the logical sequence number.

4. The computer-implemented method of claim 3, wherein:
   polling the keystore for the logical sequence number comprises: responsive to detecting a new logical sequence number, reading, by the data plane, the write ahead log for a newest logical sequence number, an associated key identifier, and an associated encrypted key-encryption key; and
   the method further comprises:
      storing, by the data plane, in a local storage of the data plane, the newest logical sequence number, the associated key identifier, and the associated encrypted key-encryption key; and
      publishing, by the data plane, the newest logical sequence number to the keystore.

5. The computer-implemented method of claim 4, comprising
   in response to a control plane write instruction:
      incrementing the logical sequence number; and
      writing, to the write ahead log, the incremented logical sequence number, the key identifier, and the encrypted key-encryption key.

6. The computer-implemented method of claim 1, wherein the key identification, the encrypted key-encryption key, and the request to store the key identification and the encrypted key-encryption key to the keystore are received from the client device via a domain name system.

7. The computer-implemented method of claim 6, wherein the domain name system selects the computing device based on a round-robin format.

8. The computer-implemented method of claim 1, wherein:
   the client device uses the key-encryption key to encrypt one or more encryption keys.

9. The computer-implemented method of claim 8, comprising:
   storing an encrypted file at the client device, the encrypted file being encrypted an encryption key of the one or more encryption keys.

10. The computer-implemented method of claim 1, wherein:
    the encrypted key-encryption key is generated by encrypting the key-encryption key using a second encryption key.

11. The computer-implemented method of claim 10, comprising:
    generating the second encryption key at the client device; and
    generating the encrypted key-encryption key by encrypting the key-encryption key at the client device using the second encryption key.

12. A cloud infrastructure node, comprising:
    a processor; and
    a non-transitory computer-readable medium including instructions that, when executed by the processor, cause the processor to:
    receive, by a computing device of a cloud computing system, a key identification, an encrypted key-encryption key, an identity of a client device, and a request from the client device to store the key identification and the encrypted key-encryption key, wherein the encrypted key-encryption key is generated by encrypting a key-encryption key;
    verify, by a control plane of the computing device, the request based at least in part on:
       validating the identity of the client device, and
       validating whether the client device is authorized to store the key identification and encrypted key-encryption key;
    transmit, by the control plane of the computing device and based at least in part on verifying the request, the key identification, the encrypted key-encryption key, and the request to store the key identification and the encrypted key-encryption key to a keystore, wherein a logical sequence number is generated based on the request to store the key identification and the encrypted key-encryption key;
poll, by a data plane of the computing device, the keystore for the logical sequence number and the encrypted key-encryption key;
read, by the data plane of the computing device and in response to detecting the logical sequence number, the key identification and the encrypted key-encryption key from the keystore;
store, by the data plane of the computing device, the logical sequence number, the key identification, and the encrypted key-encryption key in a storage of the computing device; and
transmit, by the data plane of the computing device, the stored logical sequence number to the keystore.

13. The cloud infrastructure node of claim 12, wherein verifying the authority of the client device comprises:
receiving, by a control plane of the cloud infrastructure node, the identity of the client device; and
verifying, by the control plane of the cloud infrastructure node, the authority of the client device by comparing the identity of the client device to a list of authorized client devices.

14. The cloud infrastructure node of claim 12, wherein reading the key identification and the encrypted key-encryption key from the keystore comprises reading the key identification and the encrypted key-encryption key from a write ahead log of the keystore based at least in part on the logical sequence number.

15. The cloud infrastructure node of claim 12, wherein the key identification, the encrypted key-encryption key, and the request to store the key identification and the encrypted key-encryption key to the keystore are received from the client device via a domain name system.

16. The cloud infrastructure node of claim 15, wherein the domain name system selects the cloud infrastructure node based on a round-robin format.

17. A non-transitory computer-readable medium having stored thereon a sequence of instructions which, when executed by a processor, causes the processor to perform operations comprising:
receiving, by a computing device of a cloud computing system, a key identification, an encrypted key-encryption key, an identity of a client device, and a request from the client device to store the key identification and the encrypted key-encryption key, wherein the encrypted key-encryption key is generated by encrypting a key-encryption key;
verifying, by a control plane of the computing device, the request based at least in part on;
validating the identity of the client device, and
validating whether the client device is authorized to store the key identification and encrypted key-encryption key;
transmitting, by the control plane of the computing device and based at least in part on verifying the request, the key identification, the encrypted key-encryption key, and the request to store the key identification and the encrypted key-encryption key to a keystore,
wherein a logical sequence number is generated based on the request to store the key identification and the encrypted key-encryption key;
polling, by a data plane of the computing device, the keystore for the logical sequence number and the encrypted key-encryption key;
reading, by the data plane of the computing device and in response to detecting the logical sequence number, the key identification and the encrypted key-encryption key from the keystore;
storing, by the data plane of the computing device, the logical sequence number, the key identification, and the encrypted key-encryption key in a storage of the computing device; and
transmitting, by the data plane of the computing device, the stored logical sequence number to the keystore.

18. The non-transitory computer-readable medium of claim 17, wherein verifying the authority of the client device comprises:
receiving, by a control plane of a cloud infrastructure node, the identity of the client device; and
verifying, by the control plane the cloud infrastructure node, the authority of the client device by comparing the identity of the client device to a list of authorized client devices.

19. The non-transitory computer-readable medium of claim 17, wherein reading the key identification and the encrypted key-encryption key from the keystore comprises reading the key identification and the encrypted key-encryption key from a write ahead log of the keystore based at least in part on the logical sequence number.

20. The non-transitory computer-readable medium of claim 17, wherein the key identification, the encrypted key-encryption key, and the request to store the key identification and the encrypted key-encryption key to the keystore are received from the client device via a domain name system.

* * * * *

UNITED STATES PATENT AND TRADEMARK OFFICE
CERTIFICATE OF CORRECTION

| | |
|---|---|
| PATENT NO. | : 12,238,210 B2 |
| APPLICATION NO. | : 17/686757 |
| DATED | : February 25, 2025 |
| INVENTOR(S) | : Bathula et al. |

Page 1 of 1

It is certified that error appears in the above-identified patent and that said Letters Patent is hereby corrected as shown below:

In the Specification

In Column 6, Line 55, delete "212 220." and insert -- 212, 220. --, therefor.

In Column 15, Line 21, delete "tier 120" and insert -- tier 1220 --, therefor.

In Column 22, Line 46, delete "Internetl54" and insert -- Internet 1554 --, therefor.

In the Claims

In Column 32, Line 2, in Claim 17, delete "on;" and insert -- on: --, therefor.

Signed and Sealed this
Third Day of June, 2025

Coke Morgan Stewart
*Acting Director of the United States Patent and Trademark Office*